(12) United States Patent
Conlon

(10) Patent No.: US 9,495,780 B2
(45) Date of Patent: Nov. 15, 2016

(54) METHOD AND SYSTEM FOR UTILIZING TRANSFORMATION MATRICES TO PROCESS RASTERIZED IMAGE DATA

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 2104 days.

(21) Appl. No.: 12/636,331

(22) Filed: Dec. 11, 2009

(65) Prior Publication Data
US 2010/0157323 A1 Jun. 24, 2010

Related U.S. Application Data

(63) Continuation-in-part of application No. 12/338,260, filed on Dec. 18, 2008.

(51) Int. Cl.
*G06K 15/02* (2006.01)
*G06T 11/40* (2006.01)

(52) U.S. Cl.
CPC ...................................... *G06T 11/40* (2013.01)

(58) Field of Classification Search
None
See application file for complete search history.

(56) References Cited

U.S. PATENT DOCUMENTS

| | | | | |
|---|---|---|---|---|
| 5,081,594 A | * | 1/1992 | Horsley | 345/467 |
| 5,475,803 A | * | 12/1995 | Stearns et al. | 345/648 |
| 5,857,209 A | | 1/1999 | Shively | |
| 6,046,818 A | | 4/2000 | Benson | |
| 6,166,741 A | * | 12/2000 | Hemingway | 345/420 |
| 6,205,452 B1 | | 3/2001 | Warmus et al. | |
| 6,215,915 B1 | * | 4/2001 | Reyzin | 382/296 |
| 6,327,599 B1 | | 12/2001 | Warmus et al. | |
| 6,332,149 B1 | | 12/2001 | Warmus et al. | |
| 6,662,270 B1 | | 12/2003 | Sans et al. | |
| 6,952,801 B2 | | 10/2005 | Warmus et al. | |
| 7,463,261 B1 | * | 12/2008 | O'Donnell | 345/427 |
| 2001/0051964 A1 | * | 12/2001 | Warmus et al. | 707/530 |
| 2002/0113125 A1 | | 8/2002 | Schuessler et al. | |
| 2003/0098872 A1 | * | 5/2003 | Georgiev | 345/647 |
| 2004/0141207 A1 | | 7/2004 | Warmus et al. | |
| 2004/0218218 A1 | * | 11/2004 | De Bie | 358/1.18 |
| 2005/0022116 A1 | * | 1/2005 | Bowman et al. | 715/513 |

(Continued)

OTHER PUBLICATIONS

The Prosecution History Between Oct. 4, 2011 and Dec. 19, 2011 for U.S. Appl. No. 12/339,148, filed Dec. 19, 2008, Published Jun. 24, 2010, as US-2010-0156940-A1; Inventor: Zhigang Fan et al.

(Continued)

*Primary Examiner* — Barry Drennan
*Assistant Examiner* — Jason Pringle-Parker
(74) *Attorney, Agent, or Firm* — Michael J. Nickerson; Basch & Nickerson LLP

(57) ABSTRACT

A method and system render rasterized data by receiving non-rasterized page description language data and a corresponding transformation matrix representing transformation operations to be performed. The non-rasterized page description language data is rasterizing to create rasterized data. The corresponding transformation matrix is decomposed into a plurality of individual transformation operation matrices and a discrete transformation operation value, from each corresponding individual transformation operation matrix, is generated for each transformation operation to be performed upon the rasterized data. The transformation operations are performed upon the rasterized data based upon the generated discrete transformation operation values.

20 Claims, 18 Drawing Sheets

(56) References Cited

U.S. PATENT DOCUMENTS

| | | | |
|---|---|---|---|
| 2005/0283721 A1 | 12/2005 | Warmus et al. | |
| 2005/0283722 A1 | 12/2005 | Warmus et al. | |
| 2009/0148051 A1* | 6/2009 | Pham et al. | 382/219 |
| 2010/0156890 A1 | 6/2010 | Conlon | |
| 2010/0156937 A1 | 6/2010 | Conlon | |
| 2010/0156938 A1 | 6/2010 | Conlon | |
| 2010/0156940 A1 | 6/2010 | Fan et al. | |
| 2010/0157319 A1 | 6/2010 | Conlon | |
| 2010/0157320 A1 | 6/2010 | Conlon | |
| 2010/0157321 A1 | 6/2010 | Conlon | |
| 2010/0157322 A1 | 6/2010 | Conlon | |
| 2010/0157324 A1 | 6/2010 | Conlon | |
| 2010/0157325 A1 | 6/2010 | Conlon | |
| 2010/0158411 A1 | 6/2010 | Conlon | |

OTHER PUBLICATIONS

The Prosecution History as of Apr. 30, 2012 for U.S. Appl. No. 12/338,300, filed Dec. 18, 2008, Published Jun. 24, 2010, as US-2010-0158411-A1; Inventor: Paul Roberts Conlon.
The Prosecution History as of May 9, 2012 for U.S. Appl. No. 12/338,318, filed Dec. 18, 2008, Published Jun. 24, 2010, as US-2010-0156937-A1; Inventor: Paul Roberts Conlon.
The Prosecution History as of Jun. 13, 2011 for U.S. Appl. No. 12/339,148, filed Dec. 19, 2008, published Jun. 24, 2010, as US-2010-0156940-a1; Inventor: Zhigang Fan et al.
The Prosecution History Between Mar. 27, 2012 and Jun. 26, 2012 for U.S. Appl. No. 12/338,260, filed Dec. 18, 2008, Published Jun. 24, 2010, as US-2010-0156890-A1; Inventor: Paul Roberts Conlon.
The file history of U.S. Appl. No. 12/338,260.
The file history of U.S. Appl. No. 12/636,361.
The file history of U.S. Appl. No. 12/636,266.
The file history of U.S. Appl. No. 12/636,274.
The file history of U.S. Appl. No. 12/636,287.
The file history of U.S. Appl. No. 12/636,297.
The file history of U.S. Appl. No. 12/636,348.
The file history of U.S. Appl. No. 12/636,311.
The file history of U.S. Appl. No. 12/338,300.
The file history of U.S. Appl. No. 12/339,148.
The file history of U.S. Appl. No. 12/338,318.
The Prosecution History Between Jul. 3, 2012 and Aug. 22, 2012 for U.S. Appl. No. 12/338,318, filed Dec. 18, 2008, Published Jun. 24, 2010, as US-2010-0156937-A1; Inventor: Paul Roberts Conlon.
The Prosecution History Between Jul. 3, 2012 and Aug. 22, 2012 for U.S. Appl. No. 12/338,300, filed Dec. 18, 2008, Published Jun. 24, 2010, as US-2010-0158411-A1; Inventor: Paul Roberts Conlon.
The Prosecution History as of Dec. 10, 2012 for U.S. Appl. No. 12/636,287, filed Dec. 11, 2009, Published Jun. 24, 2010, as US-2010-0157321-A1; Inventor: Paul Roberts Conlon.
The Prosecution History Between Aug. 23, 2012 and Sep. 10, 2012 for U.S. Appl. No. 12/338,318, filed Dec. 18, 2008, Published Jun. 24, 2010, as US-2010-0156937-A1; Inventor: Paul Roberts Conlon.
The Prosecution History Between Aug. 23, 2012 and Sep. 10, 2012 for U.S. Appl. No. 12/338,300, filed Dec. 18, 2008, Published Jun. 24, 2010, as US-2010-0158411-A1; Inventor: Paul Roberts Conlon.
The Prosecution History between Jun. 13, 2011 and Oct. 3, 2011 for U.S. Appl. No. 12/339,148, filed Dec. 19, 2008, published Jun. 24, 2010, as US-2010-0156940-a1; Inventor: Zhigang Fan et al.
Paeth, A.W.; A Fast Algorithm for General Raster Rotation; Graphics. Interface '86, pp. 77-81; 1986; Computer Graphics Laboratory, Department of Computer Science, University of Waterloo Ontario.
The Prosecution History as of Nov. 13, 2012 for U.S. Appl. No. 12/636,311, filed Dec. 11, 2009, Published Jun. 24, 2010, as US-2010-0156938-A1; Inventor: Paul Roberts Conlon.
The Prosecution History as of Nov. 21, 2012 for U.S. Appl. No. 12/636,274, filed Dec. 11, 2009, Published Jun. 24, 2010, as US-2010-0157320-A1; Inventor: Paul Roberts Conlon.
The Prosecution History as of Nov. 26, 2012 for U.S. Appl. No. 12/636,266, filed Dec. 11, 2009, Published Jun. 24, 2010, as US-2010-0157319-A1; Inventor: Paul Roberts Conlon.
The Prosecution History Between Jul. 12, 2012 and Aug. 29, 2012 for U.S. Appl. No. 12/338,260, filed Dec. 18, 2008, Published Jun. 24, 2010, as US-2010-0156890-A1; Inventor: Paul Roberts Conlon.
The Prosecution History Between Jun. 27, 2012 and Jul. 11, 2012 for U.S. Appl. No. 12/338,260, filed Dec. 18, 2008, Published Jun. 24, 2010, as US-2010-0156890-A1; Inventor: Paul Roberts Conlon.
The Prosecution History Between May 10, 2012 and Jul. 2, 2012 for U.S. Appl. No. 12/338,318, filed Dec. 18, 2008, Published Jun. 24, 2010, as US-2010-0156937-A1; Inventor: Paul Roberts Conlon.
The Prosecution History Between May 1, 2012 and Jul. 2, 2012 for U.S. Appl. No. 12/338,300, filed Dec. 18, 2008, Published Jun. 24, 2010, as US-2010-0158411-A1; Inventor: Paul Roberts Conlon.
The Prosecution History as of Jan. 7, 2013 for U.S. Appl. No. 12/636,297, filed Dec. 11, 2009, Published Jun. 24, 2010, as US2010-0157322-A1; Inventor: Paul Roberts Conlon.
U.S. Appl. No. 12/338,260—An Unofficial Prosecution History as of Mar. 26, 2012 for U.S. Appl. No. 12/338,260, filed Dec. 18, 2008, Published Jun. 24, 2010, as US-2010-0156890-A1; Inventor: Paul Roberts Conlon.

* cited by examiner

| SOURCE ORDER | TARGET ORDER | ROTATION ANGLE(S) | ccSx | ccSy | ccTx | ccTy |
|---|---|---|---|---|---|---|
| RST | RST | ALL | 1 | 1 | 1 | 1 |
| RST | RTS | ALL | 1 | 1 | Sx | Sy |
| RST | SRT | 0, 180 | 1 | 1 | 1 | 1 |
| RST | SRT | 90, 270 | Sy/Sx | Sx/Sy | 1 | 1 |
| RST | STR | 0 | 1 | 1 | 1 | 1 |
| RST | STR | 90 | Sy/Sx | Sx/Sy | -Ty/Tx | Tx/Ty |
| RST | STR | 180 | 1 | 1 | -1 | -1 |
| RST | STR | 270 | Sy/Sx | Sx/Sy | Ty/Tx | -Tx/Ty |
| RST | TRS | 0 | 1 | 1 | Sx | Sy |
| RST | TRS | 90 | 1 | 1 | -(SyTy)/Tx | (SxTx)/Ty |
| RST | TRS | 180 | 1 | 1 | -Sx | -Sy |
| RST | TRS | 270 | 1 | 1 | (SyTy)/Tx | -(SxTx)/Ty |
| RST | TSR | 0 | 1 | 1 | Sx | Sy |
| RST | TSR | 90 | Sy/Sx | Sx/Sy | -(SyTy)/Tx | (SxTx)/Ty |
| RST | TSR | 180 | 1 | 1 | -Sx | -Sy |
| RST | TSR | 270 | Sy/Sx | Sx/Sy | (SyTy)/Tx | -(SxTx)/Ty |

FIG. 4

| SOURCE ORDER | TARGET ORDER | ROTATION ANGLE(S) | ccSx | ccSy | ccTx | ccTy |
|---|---|---|---|---|---|---|
| RTS | RST | ALL | 1 | 1 | 1/Sx | 1/Sy |
| RTS | RTS | ALL | 1 | 1 | 1 | 1 |
| RTS | SRT | 0, 180 | 1 | 1 | 1/Sx | 1/Sy |
| RTS | SRT | 90, 270 | Sy/Sx | Sx/Sy | 1/Sx | 1/Sy |
| RTS | STR | 0 | 1 | 1 | 1/Sx | 1/Sy |
| RTS | STR | 90 | Sy/Sx | Sx/Sy | -Ty/(SyTx) | Tx/(SxTy) |
| RTS | STR | 180 | 1 | 1 | -1/Sx | -1/Sy |
| RTS | STR | 270 | Sy/Sx | Sx/Sy | Ty/(SyTx) | -Tx/(SxTy) |
| RTS | TRS | 0 | 1 | 1 | 1 | 1 |
| RTS | TRS | 90 | 1 | 1 | -Ty/Tx | Tx/Ty |
| RTS | TRS | 180 | 1 | 1 | -1 | -1 |
| RTS | TRS | 270 | 1 | 1 | Ty/Tx | -Tx/Ty |
| RTS | TSR | 0 | 1 | 1 | 1 | 1 |
| RTS | TSR | 90 | Sy/Sx | Sx/Sy | -Ty/Tx | Tx/Ty |
| RTS | TSR | 180 | 1 | 1 | -1 | -1 |
| RTS | TSR | 270 | Sy/Sx | Sx/Sy | Ty/Tx | -Tx/Ty |

FIG. 5

| SOURCE ORDER | TARGET ORDER | ROTATION ANGLE(S) | ccSx | ccSy | ccTx | ccTy |
|---|---|---|---|---|---|---|
| SRT | RST | 0, 180 | 1 | 1 | 1 | 1 |
| SRT | RST | 90, 270 | Sy/Sx | Sx/Sy | 1 | 1 |
| SRT | RTS | 0, 180 | 1 | 1 | Sx | Sy |
| SRT | RTS | 90, 270 | Sy/Sx | Sx/Sy | Sy | Sx |
| SRT | SRT | ALL | 1 | 1 | 1 | 1 |
| SRT | STR | 0 | 1 | 1 | 1 | 1 |
| SRT | STR | 90 | 1 | 1 | -Ty/Tx | Tx/Ty |
| SRT | STR | 180 | 1 | 1 | -1 | -1 |
| SRT | STR | 270 | 1 | 1 | Ty/Tx | -Tx/Ty |
| SRT | TRS | 0 | 1 | 1 | Sx | Sy |
| SRT | TRS | 90 | Sy/Sx | Sx/Sy | -(SxTy)/Tx | (SyTx)/Ty |
| SRT | TRS | 180 | 1 | 1 | -Sx | -Sy |
| SRT | TRS | 270 | Sy/Sx | Sx/Sy | (SxTy)/Tx | -(SyTx)/Ty |
| SRT | TSR | 0 | 1 | 1 | Sx | Sy |
| SRT | TSR | 90 | 1 | 1 | -(SxTy)/Tx | (SyTx)/Ty |
| SRT | TSR | 180 | 1 | 1 | -Sx | -Sy |
| SRT | TSR | 270 | 1 | 1 | (SxTy)/Tx | -(SyTx)/Ty |

FIG. 6

| SOURCE ORDER | TARGET ORDER | ROTATION ANGLE(S) | ccSx | ccSy | ccTx | ccTy |
|---|---|---|---|---|---|---|
| STR | RST | 0 | 1 | 1 | 1 | 1 |
| STR | RST | 90 | Sy/Sx | Sx/Sy | Ty/Tx | -Tx/Ty |
| STR | RST | 180 | 1 | 1 | -1 | -1 |
| STR | RST | 270 | Sy/Sx | Sx/Sy | -Ty/Tx | Tx/Ty |
| STR | RTS | 0 | 1 | 1 | Sx | Sy |
| STR | RTS | 90 | Sy/Sx | Sx/Sy | (SyTy)/Tx | -(SxTx)/Ty |
| STR | RTS | 180 | 1 | 1 | -Sx | -Sy |
| STR | RTS | 270 | Sy/Sx | Sx/Sy | -(SyTy)/Tx | (SxTx)/Ty |
| STR | SRT | 0 | 1 | 1 | 1 | 1 |
| STR | SRT | 90 | 1 | 1 | Ty/Tx | -Tx/Ty |
| STR | SRT | 180 | 1 | 1 | -1 | -1 |
| STR | SRT | 270 | 1 | 1 | -Ty/Tx | Tx/Ty |
| STR | STR | ALL | 1 | 1 | 1 | 1 |
| STR | TRS | 0, 180 | 1 | 1 | Sx | Sy |
| STR | TRS | 90, 270 | Sy/Sx | Sx/Sy | Sx | Sy |
| STR | TSR | ALL | 1 | 1 | Sx | Sy |

FIG. 7

| SOURCE ORDER | TARGET ORDER | ROTATION ANGLE(S) | ccSx | ccSy | ccTx | ccTy |
|---|---|---|---|---|---|---|
| TRS | RST | 0 | 1 | 1 | 1/Sx | 1/Sy |
| TRS | RST | 90 | 1 | 1 | Ty/(SxTx) | -Tx/(SyTy) |
| TRS | RST | 180 | 1 | 1 | -1/Sx | -1/Sy |
| TRS | RST | 270 | 1 | 1 | -Ty/(SxTx) | Tx/(SyTy) |
| TRS | RTS | 0 | 1 | 1 | 1 | 1 |
| TRS | RTS | 90 | 1 | 1 | Ty/Tx | -Tx/Ty |
| TRS | RTS | 180 | 1 | 1 | -1 | -1 |
| TRS | RTS | 270 | 1 | 1 | -Ty/Tx | Tx/Ty |
| TRS | SRT | 0 | 1 | 1 | 1/Sx | 1/Sy |
| TRS | SRT | 90 | Sy/Sx | Sx/Sy | Ty/(SxTx) | -Tx/(SyTy) |
| TRS | SRT | 180 | 1 | 1 | -1/Sx | -1/Sy |
| TRS | SRT | 270 | Sy/Sx | Sx/Sy | -Ty/(SxTx) | Tx/(SyTy) |
| TRS | STR | 0, 180 | 1 | 1 | 1/Sx | 1/Sy |
| TRS | STR | 90, 270 | Sy/Sx | Sx/Sy | 1/Sy | 1/Sx |
| TRS | TRS | ALL | 1 | 1 | 1 | 1 |
| TRS | TSR | 0, 180 | 1 | 1 | 1 | 1 |
| TRS | TSR | 90, 270 | Sy/Sx | Sx/Sy | 1 | 1 |

FIG. 8

| SOURCE ORDER | TARGET ORDER | ROTATION ANGLE(S) | ccSx | ccSy | ccTx | ccTy |
|---|---|---|---|---|---|---|
| TSR | RST | 0 | 1 | 1 | 1/Sx | 1/Sy |
| TSR | RST | 90 | Sy/Sx | Sx/Sy | Ty/(SyTx) | -Tx/(SxTy) |
| TSR | RST | 180 | 1 | 1 | -1/Sx | -1/Sy |
| TSR | RST | 270 | Sy/Sx | Sx/Sy | -Ty/(SyTx) | Tx/(SxTy) |
| TSR | RTS | 0 | 1 | 1 | 1 | 1 |
| TSR | RTS | 90 | Sy/Sx | Sx/Sy | Ty/Tx | -Tx/Ty |
| TSR | RTS | 180 | 1 | 1 | -1 | -1 |
| TSR | RTS | 270 | Sy/Sx | Sx/Sy | -Ty/Tx | Tx/Ty |
| TSR | SRT | 0 | 1 | 1 | 1/Sx | 1/Sy |
| TSR | SRT | 90 | 1 | 1 | Ty/(SyTx) | -Tx/(SxTy) |
| TSR | SRT | 180 | 1 | 1 | -1/Sx | -1/Sy |
| TSR | SRT | 270 | 1 | 1 | -Ty/(SyTx) | Tx/(SxTy) |
| TSR | STR | ALL | 1 | 1 | 1/Sx | 1/Sy |
| TSR | TRS | 0, 180 | 1 | 1 | 1 | 1 |
| TSR | TRS | 90, 270 | Sy/Sx | Sx/Sy | 1 | 1 |
| TSR | TSR | ALL | 1 | 1 | 1 | 1 |

FIG. 9

| ORDER | COMPOSITE VERIFICATION $M_3 \cdot M_2 \cdot M_1 \cdot M_0$ | INDIVIDUAL ROTATION (R), SCALING (S), TRANSLATION (T) AND SHEAR (H) CORRECTION MATRICES ($M_n$) | | | |
|---|---|---|---|---|---|
| | | $M_3$ | $M_2$ | $M_1$ | $M_0$ |
| RHST | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1. & -0.483598 & 0 \\ -0.285095 & 1. & 0 \\ 0 & 0 & 1 \end{pmatrix}$ | $\begin{pmatrix} 1.55854 & 0 & 0 \\ 0 & 0.918806 & 0 \\ 0 & 0 & 1 \end{pmatrix}$ | $\begin{pmatrix} 1. & 0 & 2.23205 \\ 0 & 1. & -0.133975 \\ 0 & 0 & 1. \end{pmatrix}$ |
| RSHT | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1.55854 & 0 & 0 \\ 0 & 0.918806 & 0 \\ 0 & 0 & 1 \end{pmatrix}$ | $\begin{pmatrix} 1. & -0.285095 & 0 \\ -0.483598 & 1. & 0 \\ 0 & 0 & 1 \end{pmatrix}$ | $\begin{pmatrix} 1. & 0 & 2.23205 \\ 0 & 1. & -0.133975 \\ 0 & 0 & 1. \end{pmatrix}$ |
| RTHS | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1. & 0 & 3.53828 \\ 0 & 1. & -1.11487 \\ 0 & 0 & 1. \end{pmatrix}$ | $\begin{pmatrix} 1. & -0.483598 & 0 \\ -0.285095 & 1. & 0 \\ 0 & 0 & 1 \end{pmatrix}$ | $\begin{pmatrix} 1.55854 & 0 & 0 \\ 0 & 0.918806 & 0 \\ 0 & 0 & 1. \end{pmatrix}$ |
| RTSH | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1. & 0 & 3.53828 \\ 0 & 1. & -1.11487 \\ 0 & 0 & 1. \end{pmatrix}$ | $\begin{pmatrix} 1.55854 & 0 & 0 \\ 0 & 0.918806 & 0 \\ 0 & 0 & 1 \end{pmatrix}$ | $\begin{pmatrix} 1. & -0.285095 & 0 \\ -0.483598 & 1. & 0 \\ 0 & 0 & 1. \end{pmatrix}$ |
| HSRT | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & -0.354605 & 0 \\ -0.157714 & 1. & 0 \\ 0 & 0 & 1 \end{pmatrix}$ | $\begin{pmatrix} 1.74471 & 0 & 0 \\ 0 & 0.762636 & 0 \\ 0 & 0 & 1 \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1. & 0 & 2.23205 \\ 0 & 1. & -0.133975 \\ 0 & 0 & 1. \end{pmatrix}$ |
| SHRT | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & -0.157714 & 0 \\ -0.354605 & 1. & 0 \\ 0 & 0 & 1 \end{pmatrix}$ | $\begin{pmatrix} 1.74471 & 0 & 0 \\ 0 & 0.762636 & 0 \\ 0 & 0 & 1 \end{pmatrix}$ | $\begin{pmatrix} 0.976953 & -0.213455 & 0 \\ 0.213455 & 0.976953 & 0 \\ 0 & 0 & 1 \end{pmatrix}$ | $\begin{pmatrix} 1. & 0 & 2.23205 \\ 0 & 1. & -0.133975 \\ 0 & 0 & 1. \end{pmatrix}$ |

FIG. 11

| ORDER | COMPOSITE VERIFICATION M3, M2, M1, M0 | INDIVIDUAL ROTATION (R), SCALING (S), TRANSLATION (T) AND SHEAR (H) CORRECTION MATRICES (Mn) | | | |
|---|---|---|---|---|---|
| | | M3 | M2 | M1 | M0 |
| HSTR | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & -0.354605 & 0 \\ -0.157714 & 1. & 0 \\ 0 & 0 & 1. \end{pmatrix}$ | $\begin{pmatrix} 1.71471 & 0 & 0 \\ 0 & 0.762636 & 0 \\ 0 & 0 & 1. \end{pmatrix}$ | $\begin{pmatrix} 1. & 0 & 2.20921 \\ 0 & 1. & 0.345555 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ |
| SHTR | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1.71471 & 0 & 0 \\ 0 & 0.762636 & 0 \\ 0 & 0 & 1. \end{pmatrix}$ | $\begin{pmatrix} 1. & -0.157714 & 0 \\ -0.354605 & 1. & 0 \\ 0 & 0 & 1. \end{pmatrix}$ | $\begin{pmatrix} 1. & 0 & 2.20921 \\ 0 & 1. & 0.345555 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ |
| TRHS | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & 0 & 3.69471 \\ 0 & 1. & -0.333913 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ | $\begin{pmatrix} 1. & -0.483598 & 0 \\ -0.285095 & 1. & 0 \\ 0 & 0 & 1. \end{pmatrix}$ | $\begin{pmatrix} 1.55854 & 0 & 0 \\ 0 & 0.918806 & 0 \\ 0 & 0 & 1. \end{pmatrix}$ |
| TRSH | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & 0 & 3.69471 \\ 0 & 1. & -0.333913 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ | $\begin{pmatrix} 1.55854 & 0 & 0 \\ 0 & 0.918806 & 0 \\ 0 & 0 & 1. \end{pmatrix}$ | $\begin{pmatrix} 1. & -0.285095 & 0 \\ -0.483598 & 1. & 0 \\ 0 & 0 & 1. \end{pmatrix}$ |
| THSR | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & 0 & 3.69471 \\ 0 & 1. & -0.333913 \\ 0 & 0 & 1. \end{pmatrix}$ | $\begin{pmatrix} 1. & -0.354605 & 0 \\ -0.157714 & 1. & 0 \\ 0 & 0 & 1. \end{pmatrix}$ | $\begin{pmatrix} 1.71471 & 0 & 0 \\ 0 & 0.762636 & 0 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ |
| TSHR | $\begin{pmatrix} 1.61747 & -0.630216 & 3.69471 \\ -0.101414 & 0.802785 & -0.333913 \\ 0. & 0. & 1. \end{pmatrix}$ | $\begin{pmatrix} 1. & 0 & 3.69471 \\ 0 & 1. & -0.333913 \\ 0 & 0 & 1. \end{pmatrix}$ | $\begin{pmatrix} 1.71471 & 0 & 0 \\ 0 & 0.762636 & 0 \\ 0 & 0 & 1. \end{pmatrix}$ | $\begin{pmatrix} 1. & -0.157714 & 0 \\ -0.354605 & 1. & 0 \\ 0 & 0 & 1. \end{pmatrix}$ | $\begin{pmatrix} 0.976953 & -0.213455 & 0 \\ 0.213455 & 0.976953 & 0 \\ 0 & 0 & 1. \end{pmatrix}$ |

FIG. 12

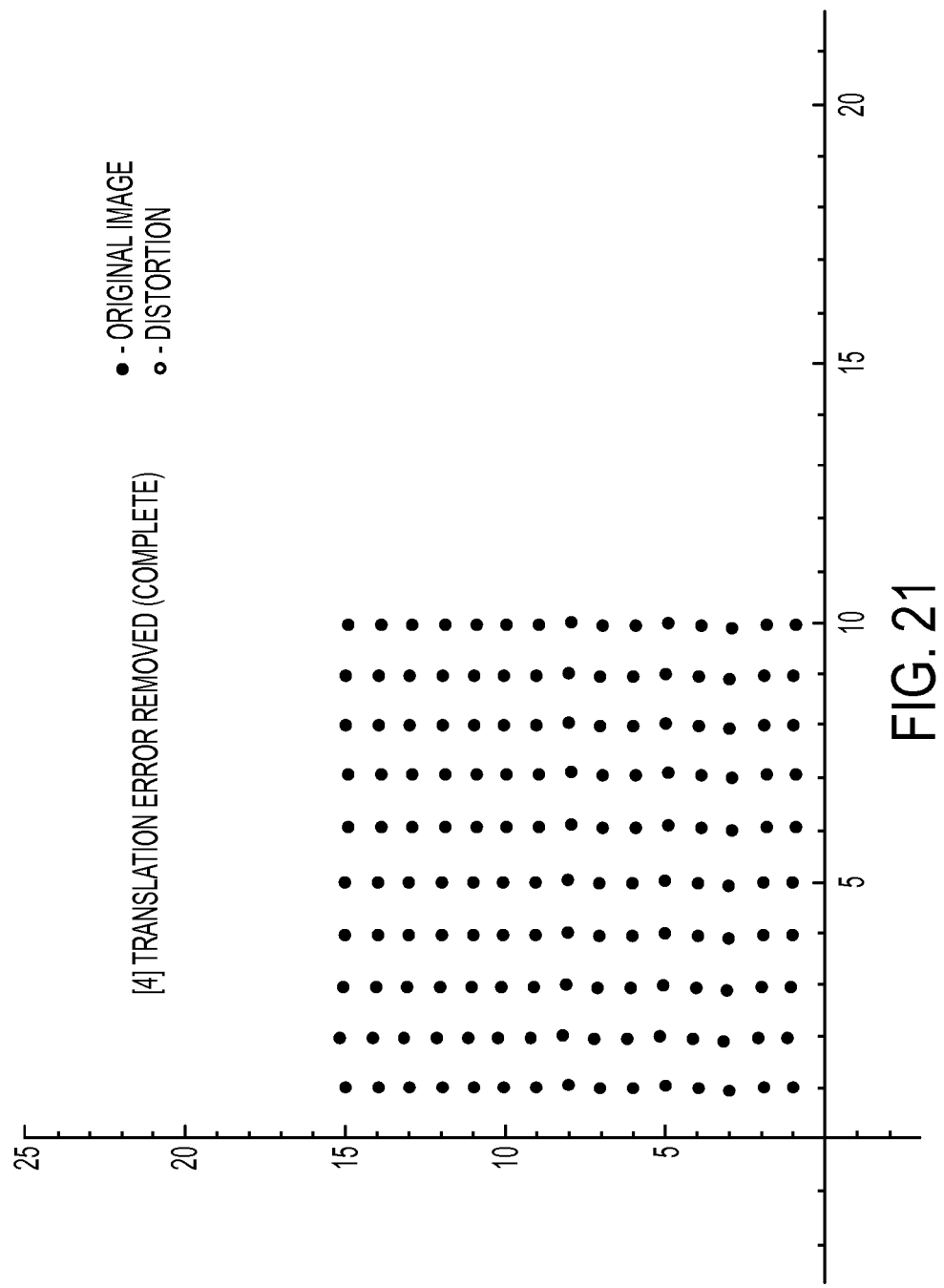

METHOD AND SYSTEM FOR UTILIZING TRANSFORMATION MATRICES TO PROCESS RASTERIZED IMAGE DATA

PRIORITY INFORMATION

The present application is a continuation-in-part of co-pending U.S. patent application Ser. No. 12/338,260, filed on Dec. 18, 2008. The present application claims priority, under 35 U.S.C. §120, from co-pending U.S. patent application Ser. No. 12/338,260, filed on Dec. 18, 2008. The entire content of U.S. patent application Ser. No. 12/338,260, filed on Dec. 18, 2008, is hereby incorporated by reference.

BACKGROUND

A document and/or image for rendering on a display device or on a recording medium, such a print media, are generated in a variety of ways; however, the generated document and/or image are conventionally in one of two forms, rasterized data or non-rasterized data.

Non-rasterized data is conventionally the result of utilizing graphics-oriented methodologies such as OpenGL, Postscript™, and scalable vector graphics to generate the document and/or image. Moreover, rasterized data is conventionally the result of a scanning process (the converting of a physical document and/or image to an electronic form) or a rasterization process.

Rasterized data is conventionally a bitmap representation of the document and/or image, whereas non-rasterized data is conventionally a file of commands and/or mathematical operations that a raster image processor can utilize the non-rasterized data to create a bitmap (rasterized data) of the document and/or image. On the other hand, digital photographic devices, such as scanners and digital cameras, directly generate rasterized data (bitmap) when converting either the image or document to an electronic representation thereof.

FIG. 1 illustrates a conventional system that processes either rasterized data or non-rasterized data for rendering by a print engine onto a recording medium. As illustrated in FIG. 1, the conventional system is, for the purposes of explanation, split into a source subsystem 10 and a rasterized data processing subsystem 20. It is noted that although this conventional system illustrates a printing system, the processing of the rasterized data or non-rasterized data may be executed by computer-based graphics cards such that the data is processed for viewing on a device.

With respect to the source subsystem 10, the data to be rendered is sourced from either a rasterized data source 11, such a scanner, or a non-rasterized data source 12, such as a personal computer which is capable of implementing graphics-oriented methodologies. If the data to be rendered is sourced from the rasterized data source 11, the rasterized data can be directly processed by rasterized image processing hardware 24.

On the other hand, if the data to be rendered is sourced from the non-rasterized data source 12, the non-rasterized data must be converted to rasterized data before it can be processed by the rasterized image processing hardware 24.

Conventionally, non-rasterized data is converted to rasterized data by a conventional raster image processing engine 14, as illustrated in FIG. 1. If the non-rasterized data has been manipulated (transformed) with respect to translation, scaling, and/or rotation, and the conventional graphics-oriented methodologies used transformation matrices to represent these manipulations, the transformation matrices are utilized in the rasterizing processor. It is noted that the individual transformation matrices can be represented in composite transformation matrix which is generated from matrix multiplication of the individual transformation matrices in transformation operational order.

Once a composite transformation matrix is generated any subsequent transformation can realized by matrix multiplication of the composite transformation matrix with the subsequent transformation matrix. Conventional transformations are translation, scaling, and rotation.

A translation transformation is the movement of a point within an image or an image from its original location to another location in two-dimensional space by a constant offset. Translations can be represented by a matrix.

A scaling transformation is performed by multiplying the position of a vertex by a scalar value. This multiplication has the effect of scaling a vertex with respect to the origin. Scaling can also be represented by a matrix. Scaling can be either symmetric or asymmetric.

A rotation transformation is a rotating of the image which depends upon on the axis around which a point is to be rotated. In conventional systems, the angle of rotation is represented by theta, $\theta$. It is noted that rotation can also be represented by a matrix.

A composite transformation matrix CTM is a matrix formed from matrix multiplications of the individual transformation matrices in the order that the transformations are performed. Thus, a single composite matrix can contain all the translation, scaling, and/or rotation information for the non-rasterized data.

The non-rasterized data is conventionally converted to rasterized data in a raster image processing engine 14 by consuming the composite transformation matrix CTM so as to produce rasterized data which is properly translated, scaled, and/or rotated. The rasterized data can then be processed by rasterized image processing hardware 24 to prepare the rasterized data for rendering by the print engine 26.

Conventionally, once the non-rasterized data is converted into rasterized form, the use of the composite transformation matrix is abandoned because conventional printing applications (print engine 26) do not accept a matrix to describe rotation, scaling, and translation. Instead conventional printing applications utilized image parameters values which are defined as variables, not in matrix form. This loss of the composite transformation matrix creates a disconnection between matrix-based algorithms and hardware to effect an imaging operation.

Compositing operations, nonetheless, are useful even when manipulating and transforming rasterized data in that compositing operations may improve accuracy, quality, and efficiency. More specifically, a rendering engine may contain processing hardware that has a unique order with respect to performing transformations (translation, scaling, and/or rotation) upon the rasterized data. It is noted that performing transformations upon the rasterized data is order dependent in that performing rotation before translation may produce a different result from performing translation before rotation.

Thus, if it is desired to manipulate the rasterized data by transformations in the order of rotation, scaling, translation (RST), but the rendering hardware is differently ordered, such as scaling, translation, rotation (STR), the rotation, scaling, translation information in the composite matrix should be decomposed in such a manner to match the order of the operations in the rendering device. The difficulty arises in deciphering (decomposing) fundamental rotation, scaling, and translations values needed to program the raster imaging algorithms (typically hardware based) when represented in matrix form.

Therefore, it is desirable to provide a system and method that is capable of utilizing a composite transformation matrix and matrix operations upon rasterized data. Moreover, it is desirable to provide a system and method that enables the proper decomposing of a composite transformation matrix such that the transformations (rotation, scaling, and/or translation) can be properly performed by a rendering device that has a predetermined transformation order which may not coincide with the transformation order used to create the composite transformation matrix.

BRIEF DESCRIPTION OF THE DRAWING

The drawings are only for purposes of illustrating various embodiments and are not to be construed as limiting, wherein:

FIGS. 4-9 illustrate tables of correction coefficients for creating a re-ordered target composite transformation matrix from a source composite transformation matrix;

FIGS. 11 and 12 illustrate tables of transformation matrices from decomposition of a composite transformation matrix and a shear decomposition;

FIGS. 18 through 21 show the correcting of the distortion in the original (reference) image by correcting rotation, then shear, then scaling, and then translation.

DETAILED DESCRIPTION

Figure 1:
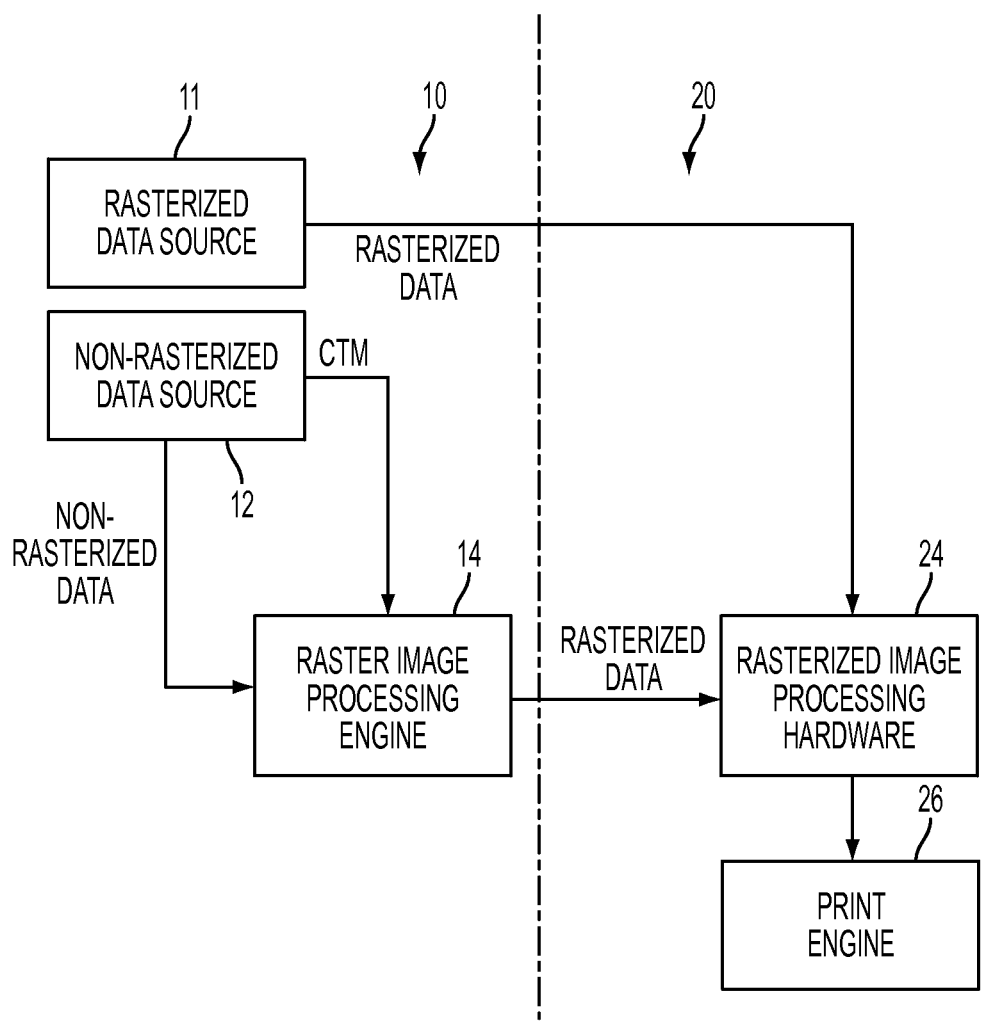
FIG. 1 is a block diagram illustrating a conventional system for rendering rasterized data.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

It is noted that the various processes described below can be implemented in or by application specific circuits, programmable circuits, software, or firmware, or any combination thereof.

Figure 2:
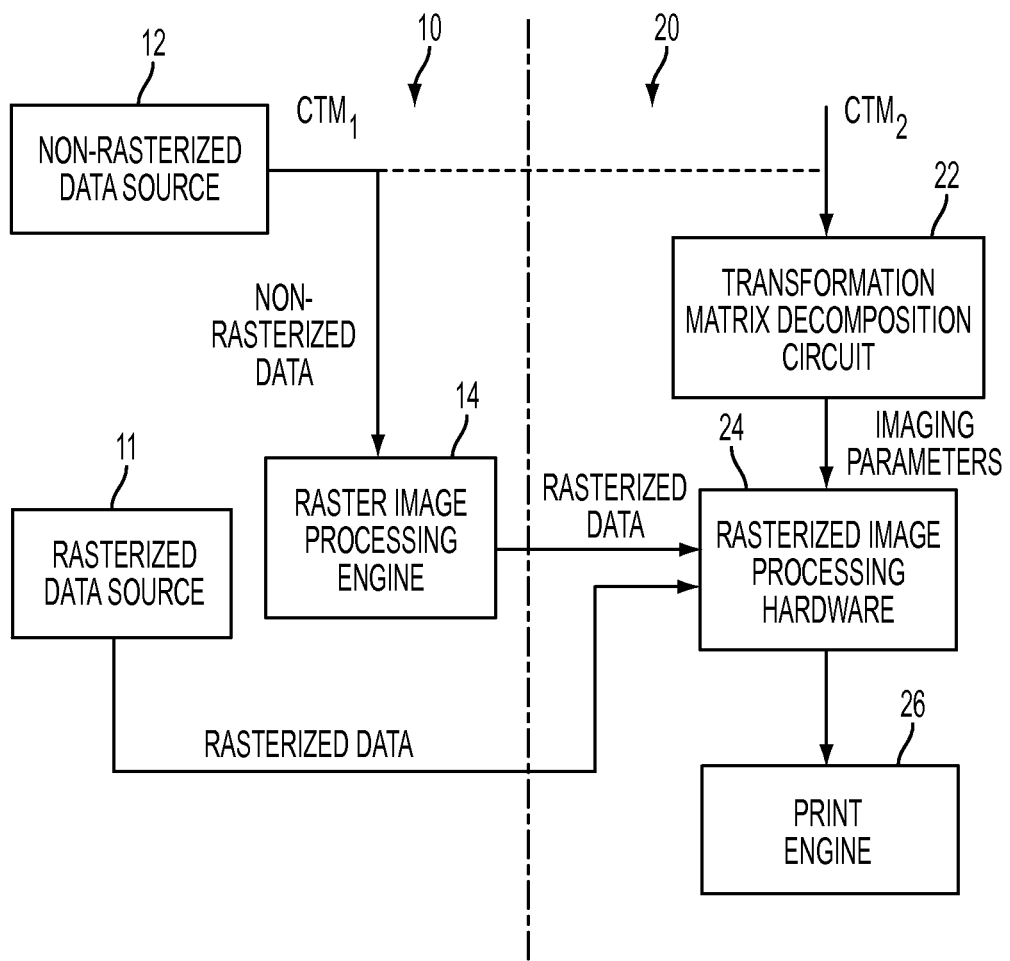
FIG. 2 is a block diagram illustrating a system for rendering rasterized data using the decomposition of a composite transformation matrix.

FIG. 2 shows a block diagram illustrating a system for rendering rasterized data using the decomposition of a composite transformation matrix. As illustrated in FIG. 2, the system is, for the purposes of explanation, split into a source subsystem 10 and a rasterized data processing subsystem 20.

With respect to the source subsystem 10, the data to be rendered is sourced from either a rasterized data source 11, such a scanner, or a non-rasterized data source 12, such as a personal computer which is capable of implementing graphics-oriented methodologies. If the data to be rendered is sourced from the rasterized data source 11, the rasterized data can be directly processed rasterized image processing hardware 24.

On the other hand, if the data to be rendered is sourced from the non-rasterized data source 12, the non-rasterized data must be converted to rasterized data before it can be processed by the rasterized image processing hardware 24.

The non-rasterized data is converted to rasterized data by a raster image processing engine 14, as illustrated in FIG. 2. In this rasterization process, if it is desired to manipulate the non-rasterized data with respect to translation, scaling, and/or rotation, using transformation matrices, the transformation matrices or composite transformation matrix is utilized, by the raster image processing engine 14, to rasterize the non-rasterized data.

As noted above, a composite transformation matrix $CTM_1$ is a matrix formed from matrix multiplications of the individual transformation matrices in the order that the transformations are performed. Thus, a single composite matrix can contain all the translation, scaling, and/or rotation information for the non-rasterized data.

As illustrated in FIG. 2, the non-rasterized data is converted to rasterized data in raster image processing engine 14; however, the composite transformation matrix $CTM_1$ is not abandoned, but may be passed onto the rasterized data processing subsystem 20 as a current transformation matrix, a matrix that represents the current transformations and order thereof that has been performed upon the rasterized data.

Moreover, the composite transformation matrix $CTM_1$ may not have been used in the rasterization process by the raster image processing engine 14 wherein the data is rasterized without utilizing composite transformation matrix $CTM_1$. In this situation, the composite transformation matrix $CTM_1$ can be passed on and merged with composite transformation matrix $CTM_2$ which represents transformations specified by a user or system, post rasterization.

The rasterized data can then be processed by the rasterized image processing hardware 24 to prepare the rasterized data for rendering by the print engine 26.

As previously noted, transformations can also be performed upon rasterized data. As in the non-rasterized situation, the transformations to be performed upon the rasterized data can be represented by composite transformation matrix $CTM_2$ (or a composite transformation matrix representing a merging of composite transformation matrix $CTM_1$ and composite transformation matrix $CTM_2$) such that the actual transformations are performed by the rasterized image processing hardware 24. In such a situation, the information representing the individual transformations in the composite transformation matrix must be extracted so that the rasterized image processing hardware 24 can properly prepare the data for rendering.

Moreover, the information representing the individual transformations in the composite transformation matrix must be extracted in such a way that the information depend upon the fixed order of the transformation operations of the rasterized image processing hardware 24. If the information is extracted independent of the fixed order of the transformation operations of the rasterized image processing hardware 24, the rasterized image processing hardware 24 may be prevented from properly preparing the data for rendering.

For example, if it is desired to manipulate the rasterized data by transformations in the order of rotation, scaling, translation (RST), but the rendering hardware is ordered as scaling, translation, rotation (STR), the rotation, scaling, translation information in the composite transformation matrix should be decomposed in such a manner to match the order of the operations in the rendering device.

To decompose the composite transformation matrix, a transformation matrix decomposition circuit 22 decomposes the composite transformation matrix in such a manner to match the order of the operations in the rendering device. One method that the transformation matrix decomposition circuit 22 may utilize is polar decomposition to determine rotation/scaling matrices and further matrix manipulations to determine the translation matrix. By using polar decomposition, the actual imaging parameters values needed by the rasterized image processing hardware 24 are derived from the matrices.

It is noted that the composite transformation matrix or current transformation matrix can be created from any number of graphics operations and that the decomposition represents a set of matrices in a specific order that when multiplied together create the same composite transformation matrix or current transformation matrix. In other words, the matrices are not necessarily related to the matrix operations that created the composite transformation matrix or current transformation matrix. The values within the decomposed matrices can be used by the rasterized image processing hardware 24 to achieve the expected results.

Figure 3:
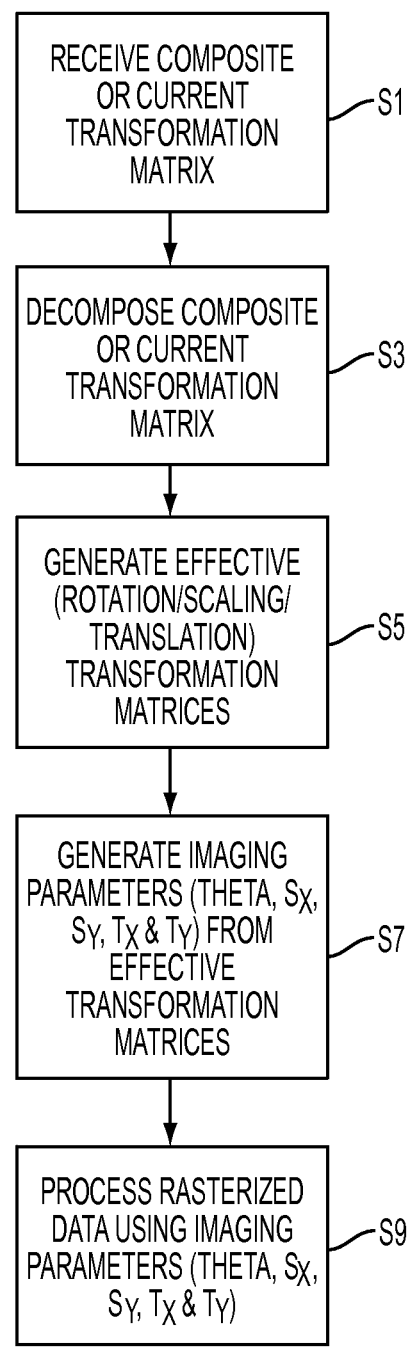
FIG. 3 is a flowchart illustrating the rendering of rasterized data using the decomposition of a composite transformation matrix.

FIG. 3 shows a flowchart illustrating a decomposition of a composite transformation matrix or current transformation matrix. As illustrated in FIG. 3, a composite transformation matrix or current transformation matrix is received, at step S1. The composite transformation matrix or current transformation matrix could represent any number of matrix multiplications of rotation (R), scaling (S), or translation (T). (It is noted that shift and translation are interchangeable terms.)

For example, a composite transformation matrix or current transformation matrix could be a series of graphics operations: Translate (T), then Scale (S1), then Rotate (R1), then Scale (S2), then Rotate (R2). Since matrix multiplication operations, in the examples discussed herein, proceed from right-->left, the generation of the composite transformation matrix or current transformation matrix would be represented as CTM=R2·S2·R1·S1·T Thereafter, in steps S3 and S5, polar decomposition generates a rotation matrix and a scaling matrix (order dependent). The translation matrix is derived from the rotation and scaling matrices and the original composite transformation matrix or current transformation matrix via matrix inverse operations.

As step S7, the discrete parameters, used to program the raster imaging algorithms, are determined from the matrices. The discrete parameters are theta: the rotation angle; Sx/Sy: the scaling values; and Tx/Ty: the translation/shift values. At step S9, the discrete parameters are used by the raster imaging algorithms or rasterized image processing hardware to process the rasterized data for rendering.

In summary, a method and/or system renders rasterized data by receiving non-rasterized page description language data and a corresponding transformation matrix representing transformation operations to be performed; rasterizing the non-rasterized page description language data to create rasterized data; decomposing the corresponding transformation matrix into a plurality of individual transformation operation matrices; generating a discrete transformation operation value, from a corresponding individual transformation operation matrix, for each transformation operation to be performed upon the rasterized data; and performing the transformation operations upon the rasterized data based upon the generated discrete transformation operation values.

The transformation operations to be performed may be rotation, scaling, and/or translation. Moreover, the corresponding transformation matrix may be decomposed in an order corresponding to an order of the transformation operations being performed upon the rasterized data. Furthermore, the corresponding transformation matrix may represent a device independent transformation operation or multiple device independent transformation operations. Also, the corresponding transformation matrix may be defined by user defined operations or by system defined operations or a combination thereof.

Alternatively, a method and/or system may control imaging operations of a rendering device by receiving a non-rasterized page description language data to be rendered; creating a transformation matrix representing transformation operations; rasterizing the received image; decomposing the transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

The transformation operations to be performed may be rotation, scaling, and/or translation. Moreover, the corresponding transformation matrix may be decomposed in an order corresponding to an order of the transformation operations being performed upon the rasterized data. Furthermore, the corresponding transformation matrix may represent a device independent transformation operation or multiple device independent transformation operations. Also, the corresponding transformation matrix may be defined by user defined operations or by system defined operations or a combination thereof.

Furthermore, a method and/or system may control imaging operations of a rendering device by receiving a non-rasterized page description language data to be rendered; rasterizing the received image; creating, post rasterization, a transformation matrix representing transformation operations; decomposing the transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

The transformation operations to be performed may be rotation, scaling, and/or translation. Moreover, the corresponding transformation matrix may be decomposed in an order corresponding to a fixed order of the transformation operations being performed upon the rasterized data. Furthermore, the corresponding transformation matrix may represent a device independent transformation operation or multiple device independent transformation operations. Also, the corresponding transformation matrix may be defined by user defined operations or by system defined operations or a combination thereof.

As noted above, computer graphics and imaging application perform standard Translation (T), Rotation (R), and Scaling(S) operations in both two-dimensions and three dimensions. These operations are non-commutative, and thus, employing a given set of R, S, and T transformation matrices in the context of two different imaging architectures (e.g., one architecture rotates, scales, and then translates, while the other architecture scales, translates, then rotates) will in general produce two different results.

Therefore, when adapting an image processing algorithm to a particular imaging order, it is necessary to adjust the transformation matrices to account for any differences in assumed operation order. A solution to the reordering problem may reduce coupling to an imaging device.

For example, a process may use rotation-dependent translation and scaling coefficients to map from a source ordering (defined in either discrete variable set or matrix form), to the equivalent in the target ordering. It is noted that all possible combinations may be elucidated as a system of equations, making it simple to create a mapping for effective implementation.

More specifically, it may be possible to implement all the various processes discussed herein on a one-off basis or as a complete library that is run-time invokable. The library could exist outside of the imaging device, or it could be programmable within the device.

For illustrations purposes, various combinations of correction coefficients for two-dimensions have been tabulated and illustrated in FIGS. 4-9.

To describe the process, the following example will be utilized. In this example, the convention used is that ordering for Rotation (R), Scaling (S), and Translation (T) will be defined as an ordered tuple; order is right to left (for example, RST means translate, then scale, then rotate).

In this example, a source matrix representing the STR order is to be converted to equivalent individual transformation matrices in RTS order. It is noted that matrices are concatenated into a composite matrix. Moreover, it is noted that while the individual matrices are different, the composite matrices for each ordering will be identical.

// Create source matrices sourceTranslation=translate2D[3,4]

$$\begin{vmatrix} 1 & 0 & 3 \\ 0 & 1 & 4 \\ 0 & 0 & 1 \end{vmatrix}$$

sourceScale=scale2D[0.5, 2.0]

$$\begin{vmatrix} 0.5 & 0 & 0 \\ 0 & 2 & 0 \\ 0 & 0 & 1 \end{vmatrix}$$

sourceRotation=rotate2D[$\pi$/2]

$$\begin{vmatrix} 0 & -1 & 0 \\ 1 & 0 & 0 \\ 0 & 0 & 1 \end{vmatrix}$$

// Create composite matrix for STR ordering by matrix multiplication sourceScale·sourceTranslation·sourceRotation $$\begin{vmatrix} 0 & -0.5 & 1.5 \\ 2 & 0 & 8 \\ 0 & 0 & 1 \end{vmatrix}$$

Referring to FIGS. 4-9 for mapping correction coefficients, the correction coefficients, in this example, are generated from FIG. 7, row 6, with above values to create new matrices with a different (RTS) order, wherein the angle is 90 degrees or $\pi$/2 radians. It is noted that for the above described process, the mappings are generally degree dependent.

targetTranslation=translate2D[2*4,−(0.5*3)]

$$\begin{vmatrix} 1 & 0 & 8 \\ 0 & 1 & -1.5 \\ 0 & 0 & 1 \end{vmatrix}$$

targetScale=scale2D[2,0.5]

$$\begin{vmatrix} 2 & 0 & 0 \\ 0 & 0.5 & 0 \\ 0 & 0 & 1 \end{vmatrix}$$

targetRotation=sourceRotation

It is noted that rotation is the same for both, but the order of composition differs.

// Composite for the RTS ordering and new matrices targetRotation·targetTranslation·targetScale $$\begin{vmatrix} 0 & -0.5 & 1.5 \\ 2 & 0 & 8 \\ 0 & 0 & 1 \end{vmatrix}$$

It is noted that while the scale and translation matrices are different, as is the order of matrix multiplication, the resulting composite matrices are identical.

In summary, a method and/or system renders a rasterized data by receiving a non-rasterized page description language data and a source transformation matrix representing source transformation operations, the source transformation operations being a source rotation transformation operation, a source scaling transformation operation, and a source translation transformation operation; rasterizing the non-rasterized page description language data; generating, from the source transformation matrix, a rotation dependent scaling transformation matrix and a rotation dependent translation transformation matrix; determining an order of transformation operations to be performed upon the rasterized data; creating a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposing the target transformation matrix into a plurality of individual transformation operation matrices; generating a discrete transformation operation value, from a corresponding individual transformation operation matrix, for each transformation operation to be performed upon the rasterized data; and performing the transformation operations upon the rasterized data based upon the generated discrete transformation operation values.

It is noted that the source transformation matrix is defined by user defined operations, by system defined operations, or a combination thereof.

Alternatively, a method and/or system may control imaging operations of a rendering device by receiving a non-rasterized page description language data to be rendered; creating a source transformation matrix representing source transformation operations, the source transformation operations being a source rotation transformation operation, a source scaling transformation operation, and a source translation transformation operation; rasterizing the received image; generating, from the source transformation matrix, a rotation dependent scaling transformation matrix and a rotation dependent translation transformation matrix; determining an order of transformation operations to be performed upon the rasterized data; creating a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposing the target transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

Also, a method and/or system may control imaging operations of a rendering device by receiving a non-rasterized page description language data to be rendered; rasterizing the received image; creating, post rasterization, a source transformation matrix representing transformation operations; generating, from the source transformation matrix, a rotation dependent scaling transformation matrix and a rotation dependent translation transformation matrix; determining an order of transformation operations to be performed upon the rasterized data; creating a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposing the target transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

In another example, a method and/or system can use composite transformations, decompose into discrete values for rotation, translation, and scaling, and reorder these values for any order required by an imaging device. This decouples algorithms from imaging hardware specifics allowing abstract algorithms to be developed. It is noted that reflection can be viewed as a special case of scaling. Such an example is set forth below.

//Create an arbitrary but complex composite transformation matrix (CTM)

complexCTM=rotate2D[$\pi$/2]·translate2D[14,−42]·rotate2D[$\pi$]·scale2D[3,4]·rotate2D[3$\pi$/2]·translate2D[12,−4]·scale2D[½, 2]·rotate2D[$\pi$]·translate2D[1,−5]·rotate2D[$\pi$/2]

$$\begin{vmatrix} 0 & -2 & -4 \\ 6 & 0 & -4 \\ 0 & 0 & 1 \end{vmatrix}$$

// Perform the polar decomposition and matrix operations needed to derive rotation (R), scaling (S), and translation (T) matrices.

{RSTr,RSTs,RSTt}=polarDecomposition2D[complexCTM]

MatrixForm[RSTr]

$$\begin{vmatrix} 0 & -1 & 0 \\ 1 & 0 & 0 \\ 0 & 0 & 1 \end{vmatrix}$$

MatrixForm[RSTs]

$$\begin{vmatrix} 6 & 0 & 0 \\ 1 & 2 & 0 \\ 0 & 0 & 1 \end{vmatrix}$$

MatrixForm[RSTt]

$$\begin{vmatrix} 1 & 0 & -2/3 \\ 0 & 1 & 2 \\ 0 & 0 & 1 \end{vmatrix}$$

//Matrix multiply in a RST order (right to left)
// The output is identical to complexCTM above.

$$\begin{vmatrix} 0 & -2 & -4 \\ 6 & 0 & -4 \\ 0 & 0 & 1 \end{vmatrix}$$

// Based on decomposed rotation matrix, solve for the angle

Solve[r==rotate2D[theta], theta] θ=$\pi$/2

Theta is in radians and equates to a composite rotation of 90 degree. This value can be used to lookup mapping correction coefficients from the tables illustrated in FIGS. 4-9. Thereafter, the method can arbitrarily choose an order mapping. Based on coefficients, from the tables illustrated in FIGS. 4-9, new scaling and translation matrices can be created. Rotation matrix will be the same. In the example below the order mapping that was chosen is STR.

STRs=scale2D[2,6]

$$\begin{vmatrix} 2 & 0 & 0 \\ 0 & 6 & 0 \\ 0 & 0 & 1 \end{vmatrix}$$

STRt=translate2D[−2, −⅔]

$$\begin{vmatrix} 1 & 0 & -2 \\ 0 & 1 & -2/3 \\ 0 & 0 & 1 \end{vmatrix}$$

// Create a new CTM based on new matrices and STR order
STR=STRs·STRt·r $$\begin{vmatrix} 0 & -2 & -4 \\ 6 & 0 & -4 \\ 0 & 0 & 1 \end{vmatrix}$$

It is noted that this is identical to the original composite transformation matrix.

In the example above, a complex composite transformation matrix is decomposed into individual scaling, rotation, and translation matrices requiring a fixed order to recreate the original composite transformation matrix. This is useful for devices that expect discrete values for these operations (i.e. cannot accept a composite matrix).

In summary, a method and/or system may render a rasterized data by receiving a non-rasterized page description language data and a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizing the non-rasterized page description language data; generating, from the source transformation matrix, a rotation transformation matrix, a scaling transformation matrix and a translation transformation matrix based on a predetermined matrix order; determining a rotation value from the rotation transformation matrix; determining an order of transformation operations to be performed upon the rasterized data; creating an order dependent rotation dependent scaling transformation matrix and an order dependent rotation dependent translation transformation matrix; creating a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposing the target transformation matrix into a plurality of individual transformation operation matrices; generating a discrete transformation operation value, from a corresponding individual transformation operation matrix, for each transformation operation to be performed upon the rasterized data; and performing the transformation operations upon the rasterized data based upon the generated discrete transformation operation values.

It is noted that the source transformation matrix is defined by user defined operations, by system defined operations, or a combination thereof.

Alternatively, a method and/or system may control imaging operations of a rendering device by receiving a non-rasterized page description language data to be rendered; creating a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizing the received image; generating, from the source transformation matrix, a rotation transformation matrix, a scaling transformation matrix and a translation transformation matrix based on a predetermined matrix order; determining a rotation value from the rotation transformation matrix; determining an order of transformation operations to be performed upon the rasterized data; creating an order dependent rotation dependent scaling transformation matrix and an order dependent rotation dependent translation transformation matrix; creating a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposing the target transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

Also, a method and/or system may control imaging operations of a rendering device by receiving a non-rasterized page description language data to be rendered; rasterizing the received image; creating, post rasterization, a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; generating, from the source transformation matrix, a rotation transformation matrix, a scaling transformation matrix and a translation transformation matrix based on a predetermined matrix order; determining a rotation value from the rotation transformation matrix; determining an order of transformation operations to be performed upon the rasterized data; creating an order dependent rotation dependent scaling transformation matrix and an order dependent rotation dependent translation transformation matrix; creating a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposing the target transformation matrix representing the transformation operations into a plurality of ordered transformational operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

It is further noted that rotation, scaling, and translation are basic image (geometric) transformation operations. Their parameters generally depend on the order of the operations. As previously noted, there are two fundamental issues: 1) given a target transformation specified by a composite transformation matrix, how to implement it with rotation, scaling, and translation operations with a pre-defined order; 2) for a sequence of rotation, scaling, and translation operations, how to implement it with a different order. These issues are particularly important in a system including devices with heterogeneous imaging architectures.

Some of the methods previously discussed decompose a composite transformation matrix into a concatenation, via matrix algebra, of translation, scaling, and rotation. The rotation and scaling matrices are first obtained using a standard polar decomposition, and the translation is then calculated using matrix algebra.

In other previously discussed methods a series of translation, rotation and scaling operations are implemented in an arbitrary order. A composite transformation matrix is first created to represent the series of operations. The composite transformation matrix is then decomposed into a concatenation of translation, scaling, and rotation. The resulting operations are then mapped to the desired target order by utilizing the tables illustrated in FIGS. 4-9.

In a further method, a composite transformation matrix is in any arbitrary order. An example of the decomposition of composite transformation matrix in any arbitrary order is set forth below.

Initially, a 3×3 composite transformation matrix is used wherein the upper left 2×2 sub-matrix represents rotation and scaling and its (1,3) and (2,3) elements specifies x- and y-translations, respectively. The (3,1) and (3,2) elements are always 0 and (3,3) is always 1. To decompose a composite transformation matrix into a concatenation of translation, scaling, and rotation, the rotation and scaling matrices are first obtained using a standard Polar Decomposition. Specifically, for rotation following scaling, $$A=R'S' \quad (1)$$

where A is the upper left 2×2 sub-matrix of the composite transformation matrix, and 2×2 matrices R' and S' are given by:

$$S'=\sqrt{A^*A} \quad (2)$$

where A* denotes the conjugate transpose of A and S' is derived from a matrix square root operation, and $$R'=AS'^{-1} \quad (3)$$

The rotation matrix R can be obtained by augmenting R'. Specifically, the upper left 2×2 sub-matrix of R is identical to R'. $R_{33}$ is set to 1 and the rest elements to 0. The scaling matrix S can be augmented from S' in an identical fashion. For scaling following rotation, $$A=S'R' \quad (4)$$

S' and R' are calculated from $$S'=\sqrt{AA^*} \quad (5)$$

and $$R'=S'^{-1}A \quad (6)$$

Identical to the RS order, R and S are obtained by augmenting R' and S', respectively.

Once rotation and scaling matrices R and S are determined, translation can be evaluated by matrix operations for different rotation, scaling and translation orders:

a) RST order
  R and S are obtained using (2)-(3).

$$T=S^{-1}R^{-1}C,$$

where C is the CTM required.

b) RTS order
  R and S are obtained using (2)-(3).

$$T=R^{-1}CS^{-1}$$

c) SRT order
  R and S are obtained using (5)-(6).

$$T=R^{-1}S^{-1}C$$

d) STR order
  R and S are obtained using (5)-(6).

$$T=S^{-1}CR^{-1}$$

e) TRS order
  R and S are obtained using (2)-(3).

$$T=CS^{-1}R^{-1}$$

f) TSR order
  R and S are obtained using (5)-(6).

$$T=CR^{-1}S^{-1}$$

To implement a serious of translation, rotation, and scaling in an arbitrary order, a composite transformation matrix is first created to represent the series of operations. This can be accomplished by generating rotation, scaling, or translation matrix for each operation, and multiplying the resulting matrices. The composite transformation matrix is then decomposed into a concatenation of translation, scaling, and rotation in the destination order applying the techniques disclosed above.

Another example of this method of the decomposition of composite transformation matrix in any arbitrary order is set froth below. In this example, the source operation sequence is in the STR order with:

Source Translation=translate 2D[3,4]

$$\begin{vmatrix} 1 & 0 & 3 \\ 0 & 1 & 4 \\ 0 & 0 & 1 \end{vmatrix}$$

Source Scale=scale 2D[0.5, 2.0]

$$\begin{vmatrix} 0.5 & 0 & 0 \\ 0 & 2 & 0 \\ 0 & 0 & 1 \end{vmatrix}$$

and Source Rotation=rotation 2D [0.5π] // 90 degrees $$\begin{vmatrix} 0 & -1 & 0 \\ 1 & 0 & 0 \\ 0 & 0 & 1 \end{vmatrix}$$

The CTM, evaluated as STR, is:

$$\begin{vmatrix} 0 & -0.5 & 1.5 \\ 2 & 0 & 8 \\ 0 & 0 & 1 \end{vmatrix}$$

The following destination operations for different orders are obtained using the methods described above:

1) RST order, C=RST $$R = \begin{vmatrix} 0 & -1 & 0 \\ 1 & 0 & 0 \\ 0 & 0 & 1 \end{vmatrix}$$

$$S = \begin{vmatrix} 2 & 0 & 0 \\ 0 & 0.5 & 0 \\ 0 & 0 & 1 \end{vmatrix}$$

$$T = \begin{vmatrix} 1 & 0 & 4 \\ 0 & 1 & -3 \\ 0 & 0 & 1 \end{vmatrix}$$

2) RTS order C=RTS $$R = \begin{vmatrix} 0 & -1 & 0 \\ 1 & 0 & 0 \\ 0 & 0 & 1 \end{vmatrix}$$

$$S = \begin{vmatrix} 2 & 0 & 0 \\ 0 & 0.5 & 0 \\ 0 & 0 & 1 \end{vmatrix}$$

$$T = \begin{vmatrix} 1 & 0 & 8 \\ 0 & 1 & -1.5 \\ 0 & 0 & 1 \end{vmatrix}$$

3) SRT order, C=SRT $$R = \begin{vmatrix} 0 & -1 & 0 \\ 1 & 0 & 0 \\ 0 & 0 & 1 \end{vmatrix}$$

$$S = \begin{vmatrix} 0.5 & 0 & 0 \\ 0 & 2 & 0 \\ 0 & 0 & 1 \end{vmatrix}$$

$$T = \begin{vmatrix} 1 & 0 & 4 \\ 0 & 1 & -3 \\ 0 & 0 & 1 \end{vmatrix}$$

4) STR order, C=STR (same as the source sequence)

$$R = \begin{vmatrix} 0 & -1 & 0 \\ 1 & 0 & 0 \\ 0 & 0 & 1 \end{vmatrix}$$

$$S = \begin{vmatrix} 0.5 & 0 & 0 \\ 0 & 2 & 0 \\ 0 & 0 & 1 \end{vmatrix}$$

$$T = \begin{vmatrix} 1 & 0 & 3 \\ 0 & 1 & 4 \\ 0 & 0 & 1 \end{vmatrix}$$

5) TRS order, C=TRS $$R = \begin{vmatrix} 0 & -1 & 0 \\ 1 & 0 & 0 \\ 0 & 0 & 1 \end{vmatrix}$$

$$S = \begin{vmatrix} 2 & 0 & 0 \\ 0 & 0.5 & 0 \\ 0 & 0 & 1 \end{vmatrix}$$

$$T = \begin{vmatrix} 1 & 0 & 1.5 \\ 0 & 1 & 8 \\ 0 & 0 & 1 \end{vmatrix}$$

6) TSR order, C=TSR $$R = \begin{vmatrix} 0 & -1 & 0 \\ 1 & 0 & 0 \\ 0 & 0 & 1 \end{vmatrix}$$

$$S = \begin{vmatrix} 0.5 & 0 & 0 \\ 0 & 2 & 0 \\ 0 & 0 & 1 \end{vmatrix}$$

$$T = \begin{vmatrix} 1 & 0 & 1.5 \\ 0 & 1 & 8 \\ 0 & 0 & 1 \end{vmatrix}$$

As discussed above, the various solutions for decomposing a composite or current transformation matrix into discrete graphics operations and a technique for deriving new rotation, scaling, and translation matrices may encounter an issue in that the solutions may only work with orthogonal rotation angles and may be cumbersome to implement. Thus it is desirable to provide a solution to which is not restricted to orthogonal rotation angles and is not cumbersome to implement.

Figure 10:
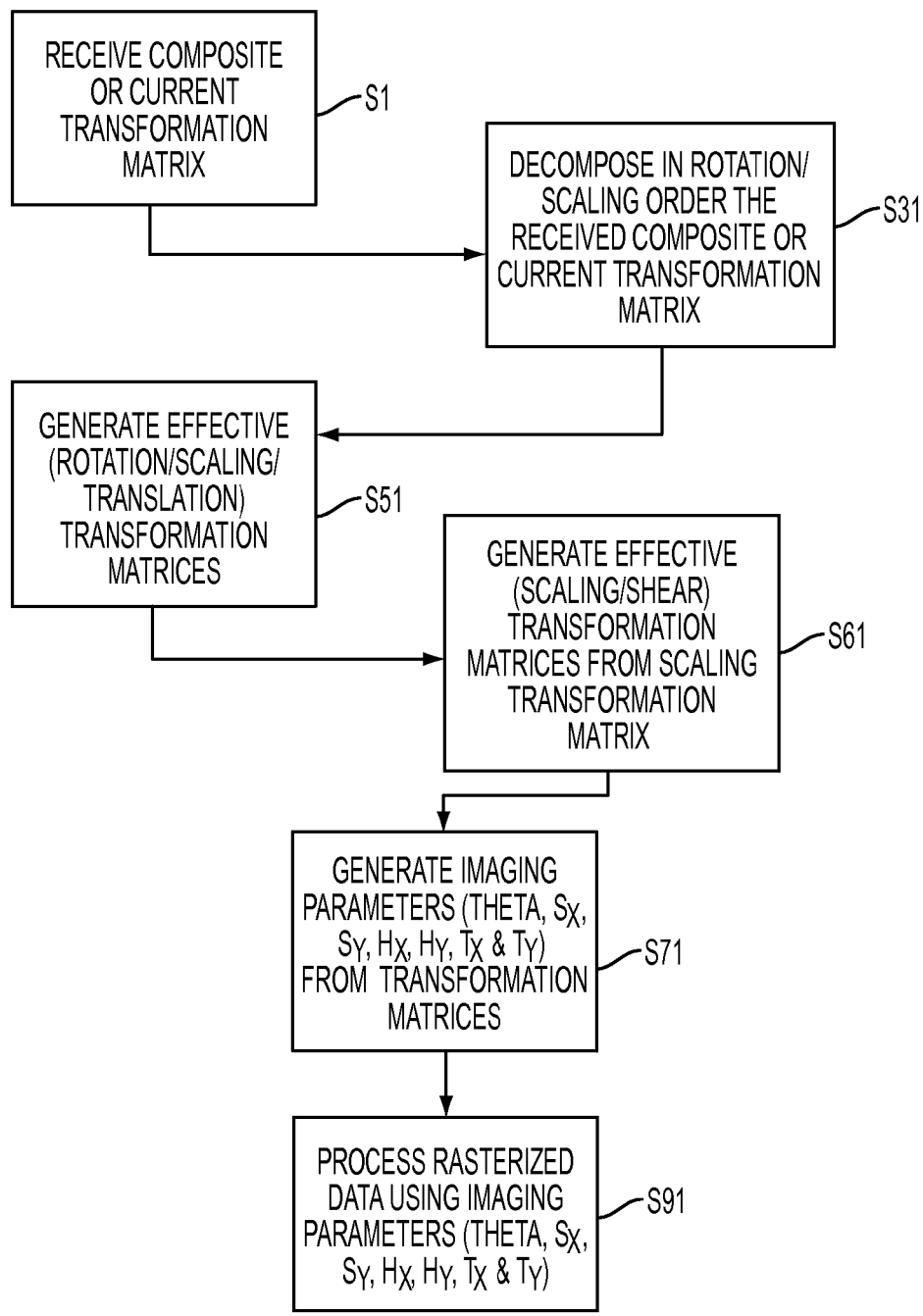
FIG. 10 is a flowchart illustrating the rendering of rasterized data using the decomposition of a composite transformation matrix to determine a shear matrix.

The following is an example of the process for determining a shear value matrix given a rotation matrix, a scaling matrix, and a translation matrix. FIG. 10 will be utilized in discussing this example.

The following composite transformation matrix is a matrix containing rotational, scaling, shear, and translation components. As illustrated in FIG. 10, a composite transformation matrix is received, at step S1.

$$\begin{pmatrix} \frac{\sqrt{3}}{2} & -1 & 0 \\ \frac{1}{2} & \sqrt{3} & 0 \\ 0 & 0 & 1 \end{pmatrix}$$

The composite transformation matrix is decomposed, at step S31 of FIG. 10, in a Rotation/Scaling order: {Ssrt, Rsrt, Tsrt}=srtDecompose2D[CTMrst] to generate effective reverse transformation matrices, at step S51. It is noted that matrix Ssrt is not a pure scaling matrix, but has values in the "off-diagonals," indicating shear.

Ssrt $$\begin{pmatrix} \frac{5}{4} & -\frac{\sqrt{3}}{4} & 0 \\ -\frac{\sqrt{3}}{4} & \frac{7}{4} & 0 \\ 0 & 0 & 1 \end{pmatrix}$$

Rsrt $$\begin{pmatrix} \frac{\sqrt{3}}{2} & -\frac{1}{2} & 0 \\ -\frac{1}{2} & \frac{\sqrt{3}}{2} & 0 \\ 0 & 0 & 1 \end{pmatrix}$$

Tsrt $$\begin{pmatrix} 1 & 0 & 0 \\ 0 & 1 & 0 \\ 0 & 0 & 1 \end{pmatrix}$$

Thereafter, the scaling matrix, Ssrt, is decomposed, at step S61 of FIG. 10, into left shear/scale/right shear matrices, as set forth below.

leftH = getShear2Dleft[Ssrt]

scale = getScale2D[Ssrt]

rightH = getShear2Dright[Ssrt]

leftH $$\begin{pmatrix} 1 & -\frac{\sqrt{3}}{7} & 0 \\ -\frac{\sqrt{3}}{5} & 1 & 0 \\ 0 & 0 & 1 \end{pmatrix}$$

scale $$\begin{pmatrix} \frac{5}{4} & 0 & 0 \\ 0 & \frac{7}{4} & 0 \\ 0 & 0 & 1 \end{pmatrix}$$

rightH $$\begin{pmatrix} 1 & -\frac{\sqrt{3}}{5} & 0 \\ -\frac{\sqrt{3}}{7} & 1 & 0 \\ 0 & 0 & 1 \end{pmatrix}$$

If the resulting matrices are matrix multiplied together, as demonstrated below, the resulting matrix is equivalent to the original composite transformation matrix. More specifically, if the left shear matrix (leftH) is matrix multiplied with the scale matrix (scale), rotation matrix (Rsrt), and the translation matrix (Tsrt), the resulting matrix is the original composite transformation matrix, as demonstrated below.

leftH·scale·Rsrt·Tsrt // MatrixForm $$\begin{pmatrix} \frac{\sqrt{3}}{2} & -1 & 0 \\ \frac{1}{2} & \sqrt{3} & 0 \\ 0 & 0 & 1 \end{pmatrix}$$

Moreover, if the scale (or scaling) matrix (scale) is matrix multiplied with the right shear matrix (rightH), rotation matrix (Rsrt), and the translation matrix (Tsrt), the resulting matrix is the original composite transformation matrix, as demonstrated below.

scale·rightH·Rsrt·Tsrt $$\begin{pmatrix} \frac{\sqrt{3}}{2} & -1 & 0 \\ \frac{1}{2} & \sqrt{3} & 0 \\ 0 & 0 & 1 \end{pmatrix}$$

At step S71, Once the rotation transformation operation matrix is determined, a discrete rotation transformation operation value {R} can be generated from the rotation transformation operation matrix. It is noted that rotation is the only operation that has a single value because the rotation is in two-dimensions. The other operations have a pair of values for each 2D dimension. Moreover, at step S71, once the scaling transformation operation matrix is determined, a discrete scaling transformation operation value pair $\{S_x, S_y\}$ can be generated from the scaling transformation operation matrix.

Furthermore, at step S71, once the translation transformation operation matrix is determined, a discrete translation transformation operation value pair $\{T_x, T_y\}$ can be generated from the translation transformation operation matrix. Lastly, at step S71, once the shear (left or right) transformation operation matrix is determined, a discrete shear transformation operation value pair $\{H_x, H_y\}$ can be generated from the shear (left or right) transformation operation matrix.

The discrete transformation operation values can be used, at step S91, by the post-rasterization processes (circuits) to prepare the image data for rendering by the printing device.

An ordering reversal for an inversed matrix product can be expressed as follows:

$(A \cdot B)^{-1} = B^{-1} \cdot A^{-1}$ where the dot (·) operator represents matrix multiplication.

This technique for using an ordering reversal for an inversed matrix product can be combined with Polar Decomposition to achieve reordering. It is noted that since the produced scaling matrix may actually be a non-commutative composite of scaling and shear, a further decomposition produces the shear matrix.

With respect to FIGS. 11 and 12, these Figures show the various transformation matrices that can be generated form from the following original composite matrix.

$$\begin{pmatrix} 1.61747 & -0.630216 & 3.69471 \\ -0.101414 & 0.802785 & -0.333913 \\ 0. & 0. & 1. \end{pmatrix}$$

This composite matrix was generated from a series of arbitrarily chosen operations of rotation, scaling, translation, and shear. As shown above, decomposition of the "scaling" matrix into scaling and shear submatrices for multiple orderings can be realized. Moreover, since the interaction between the matrices is non-commutative, left and right shear decompositions are determined. The notations R, S, H, and T, in FIGS. 11 and 12, represent the rotation matrix, scaling matrix, shear matrix, and translation matrix, respectively, as shown in the table below. The matrices are in standard affine form used in computer graphics.

| Rotation (R) | Scaling (S) | Shear (H) | Translation (T) |
|---|---|---|---|
| $\begin{pmatrix} \cos[\phi] & -\sin[\phi] & 0 \\ \sin[\phi] & \cos[\phi] & 0 \\ 0 & 0 & 1 \end{pmatrix}$ | $\begin{pmatrix} Sx & 0 & 0 \\ 0 & Sy & 0 \\ 0 & 0 & 1 \end{pmatrix}$ | $\begin{pmatrix} 1 & Hx & 0 \\ Hy & 1 & 0 \\ 0 & 0 & 1 \end{pmatrix}$ | $\begin{pmatrix} 1 & 0 & Tx \\ 0 & 1 & Ty \\ 0 & 0 & 1 \end{pmatrix}$ |

By determining shear matrices, possible distortions can be identified and operations performed to correct for this type of distortions. For example, shear effects caused by raster output scanning misalignment. As discussed above, decomposition is performed upon the original composite matrix to generate operational matrices. It is noted that the operational matrices are a function of the order of decomposition. Further, the composite columns in the tables of FIGS. 11 and 12 are the matrix multiplication of all matrices and are used as a verification to ensure the decomposition is correct.

FIGS. 13 through 21 provide a set of visual examples of using the decomposed correction matrices in a step-wise fashion to bring a set of "warped" points (or distorted image) into alignment with the original (reference) image. In FIGS. 13 through 21, the filled-in dots represent the original (reference) image and the hollow dots represent the "warped" points or distorted image.

Figure 13:
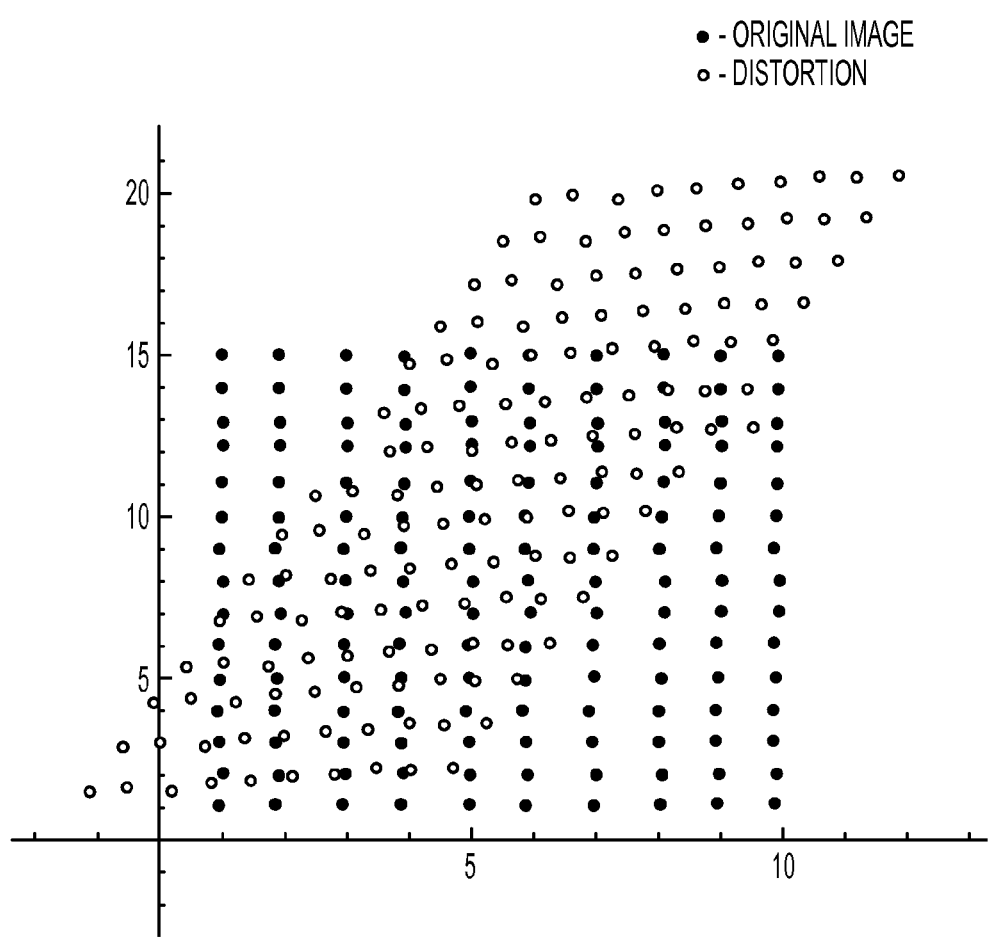
FIG. 13 shows an example of an original (reference) image and a distortion of the original (reference) image.
Figure 14:
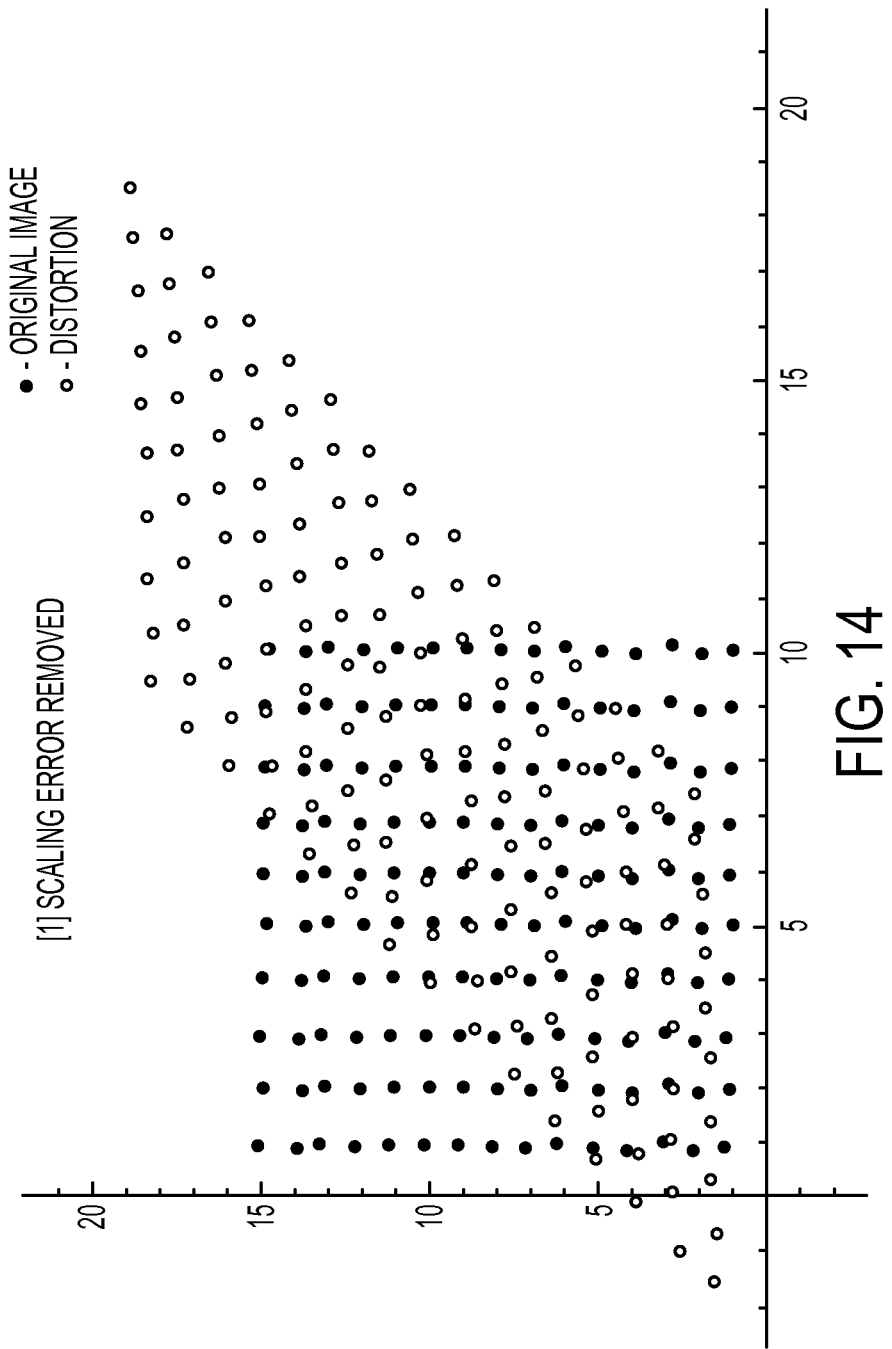
FIGS. 14 through 17 show the correcting of the distortion in the original (reference) image by correcting scaling, then shear, then translation, and then rotation.
Figure 15:
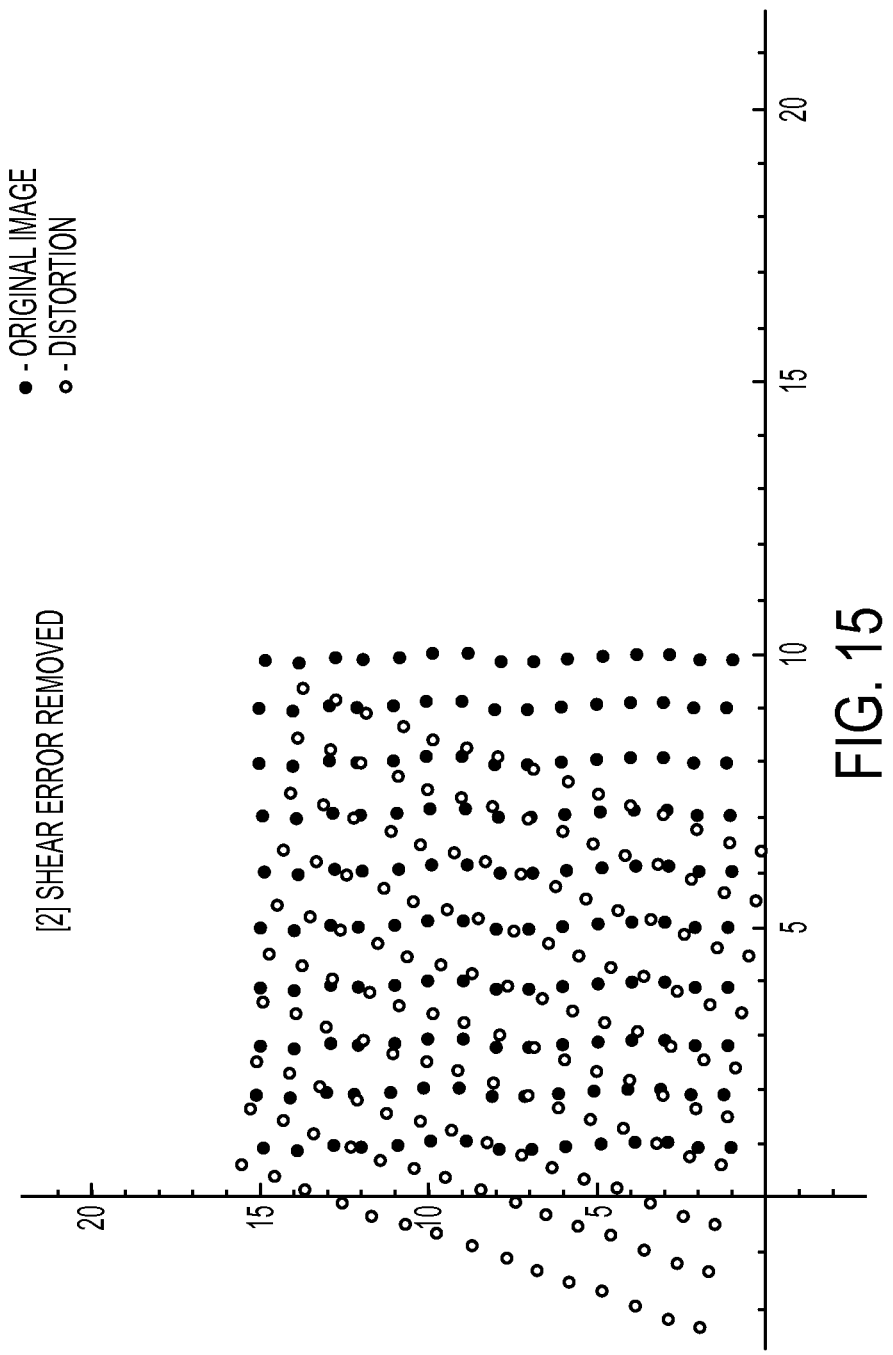
Figure 16:
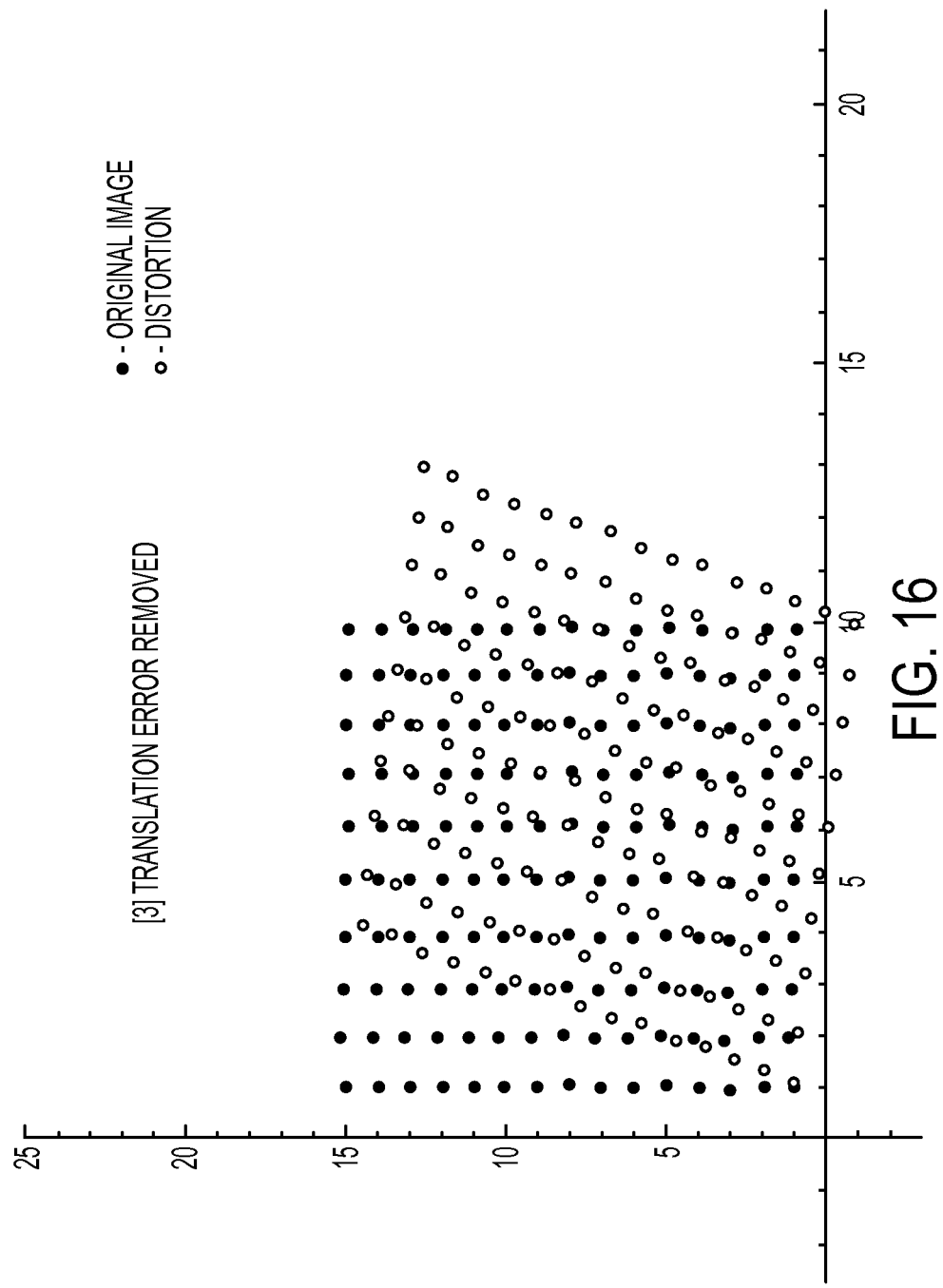

FIGS. 13 through 21 demonstrate that different orderings are possible and alignment is achieved with any ordering. Moreover, FIG. 13 illustrates the set of "warped" points (or distorted image) with the original (reference) image.

Figure 17:
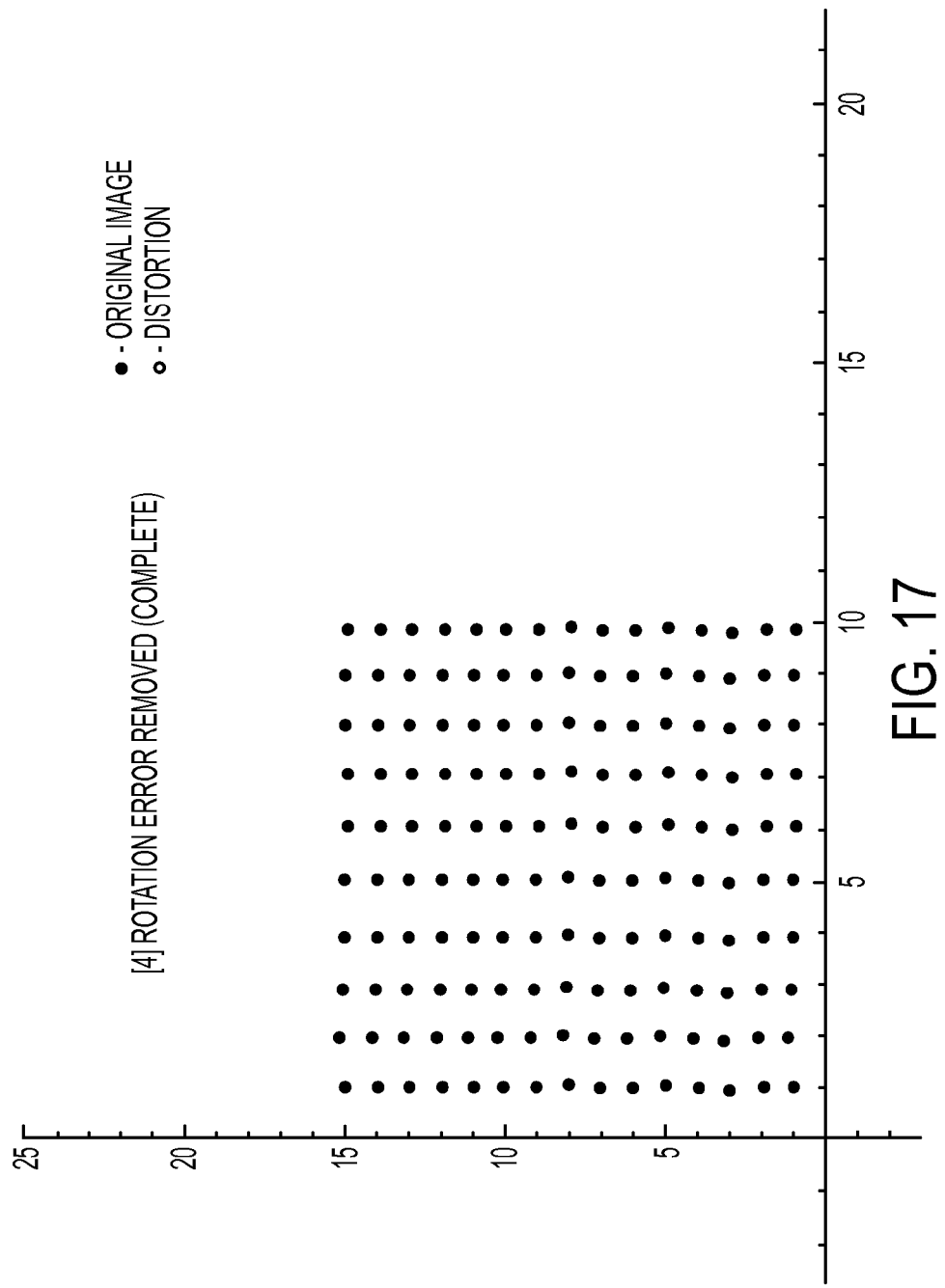
Figure 18:
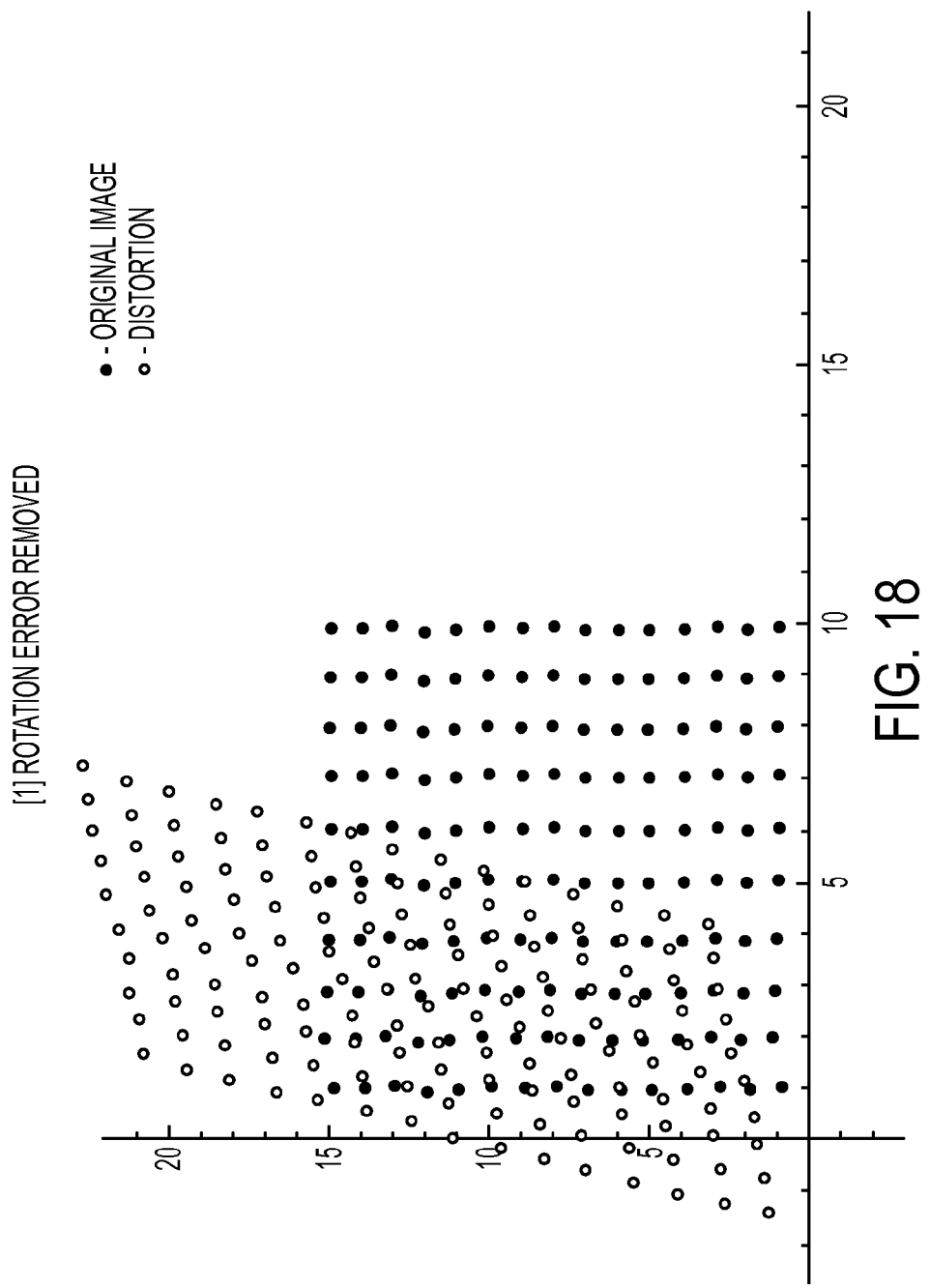
Figure 19:
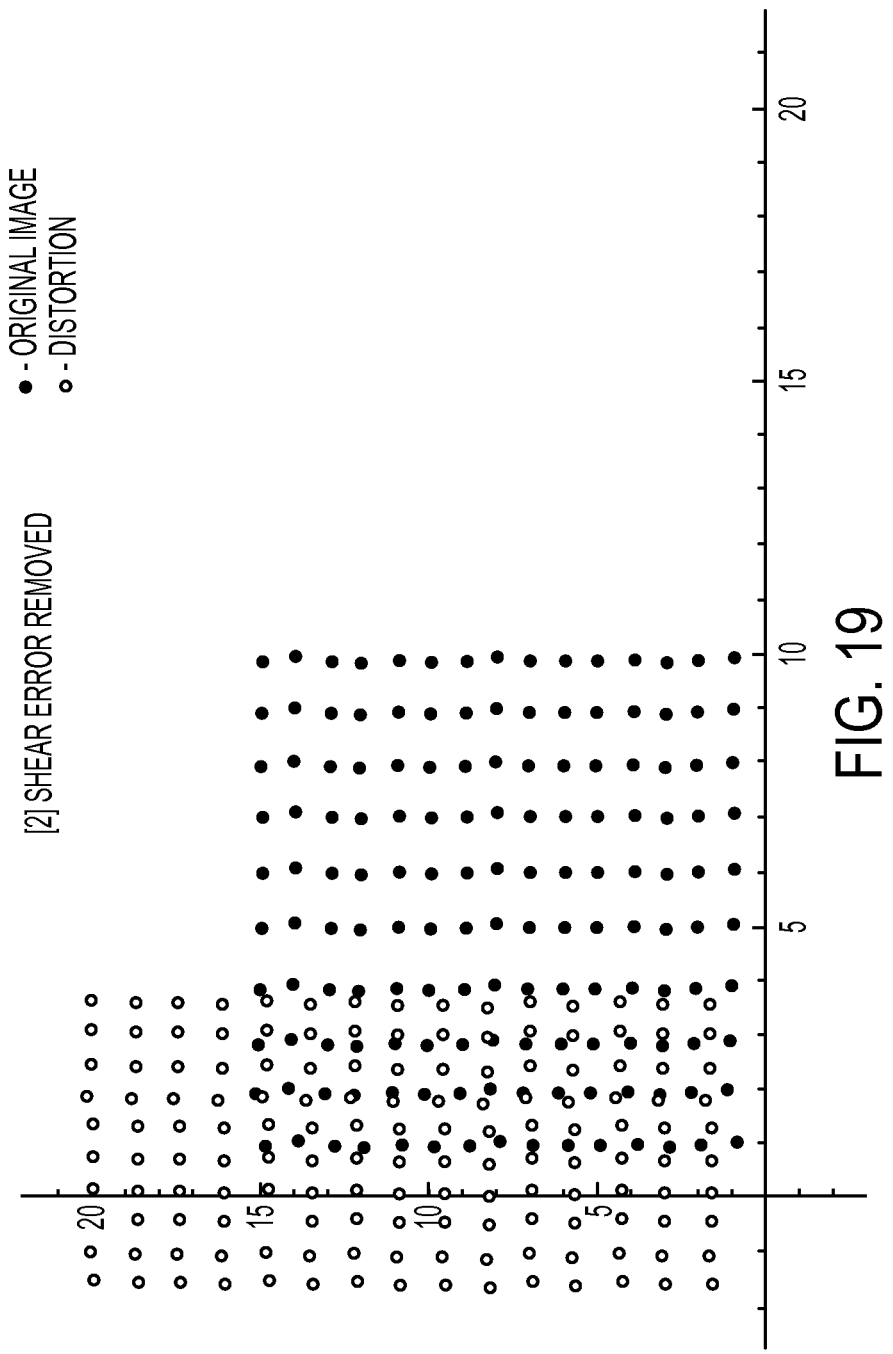
Figure 20:
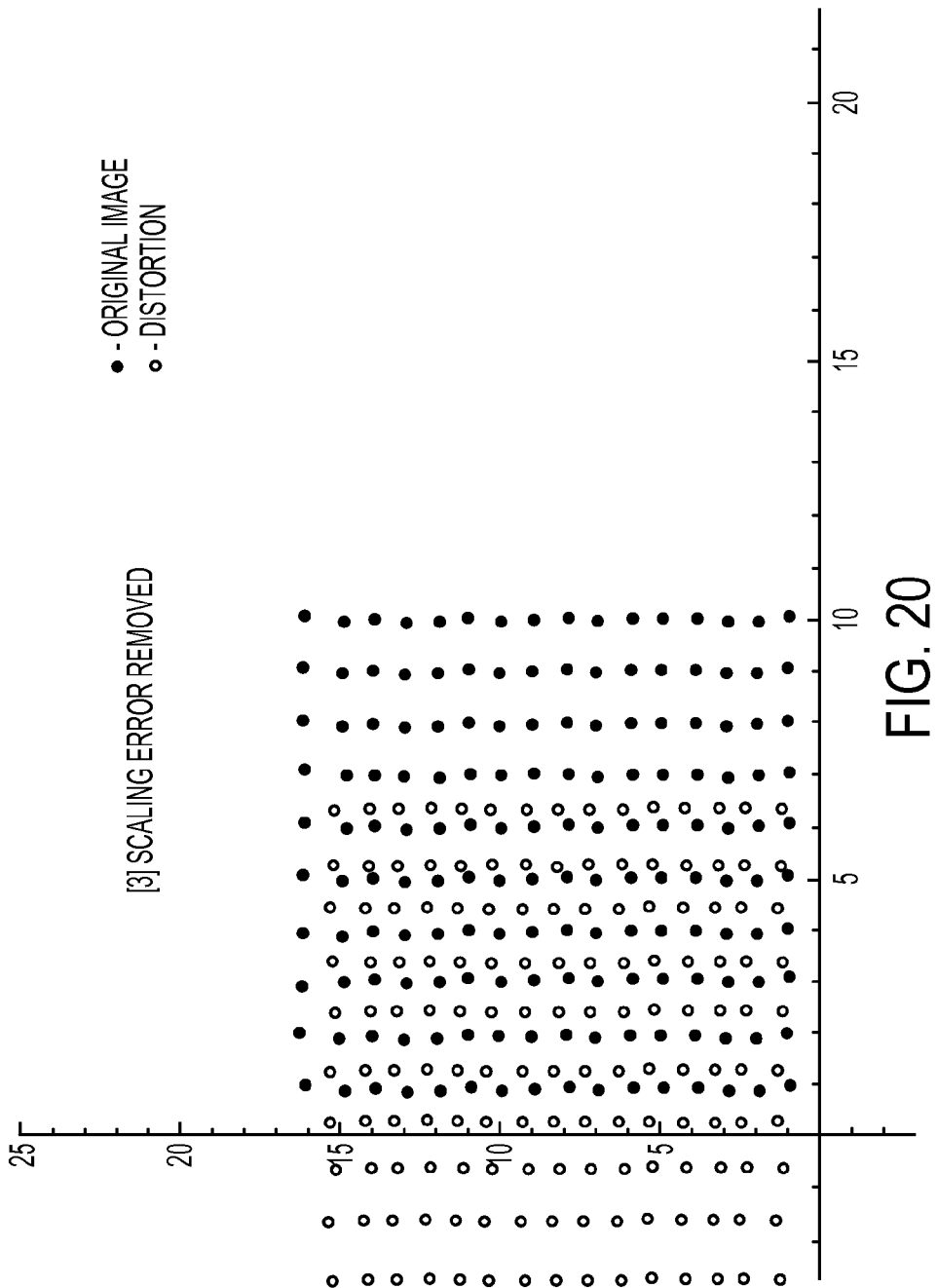

For example, one system, as illustrated in FIGS. 14 through 17, may correct scaling (FIG. 14), then shear (FIG. 15), then translation (FIG. 16), and then rotation (FIG. 17).

In another example, a system, as illustrated in FIGS. 18 through 21, may correct rotation (FIG. 18), then shear (FIG. 19), then scaling (FIG. 20), and then translation (FIG. 21).

It is noted that for the component not involved in the reversal process during decomposition, the component's effect is that of an additive or multiplicative identity. In other words, the non-contributing component resulting from the Polar Decomposition will appear to have either zero rotation, unit scaling, or zero translation such that, for subsequent operations, this component can be ignored.

In summary, a method and/or system may rendering a rasterized data by receiving a non-rasterized page description language data and a source transformation matrix representing source transformation operations, the source transformation operations being a source rotation transformation operation, a source scaling transformation operation, and a source translation transformation operation; rasterizing the non-rasterized page description language data; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformation operation matrix, for each transformation operation to be performed upon the rasterized data; and performing the transformation operations upon the rasterized data based upon the generated discrete transformation operation values.

It is noted that the source transformation matrix is defined by user defined operations, by system defined operations, or a combination thereof.

Alternatively, a method and/or system may control imaging operations of a rendering device by receiving a non-rasterized page description language data to be rendered; creating a source transformation matrix representing source transformation operations, the source transformation operations being a source rotation transformation operation, a source scaling transformation operation, and a source translation transformation operation; rasterizing the received image; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

Also, a method and/or system may control imaging operations of a rendering device by receiving a non-rasterized page description language data to be rendered; rasterizing the received image; creating, post rasterization, a source transformation matrix representing transformation operations; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

Furthermore, a method and/or system may control imaging operations of a rendering device by receiving a non-rasterized page description language data and a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a translation transformation operation; rasterizing the non-rasterized page description language data; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformation operation matrix, for each transformation operation to be performed upon the rasterized data; and performing the transformation operations upon the rasterized data based upon the generated discrete transformation operation values.

It is noted that the source transformation matrix is defined by user defined operations, by system defined operations, or a combination thereof.

Moreover, a method and/or system may control imaging operations of a rendering device by receiving a non-rasterized page description language data to be rendered; creating a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizing the received image; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

Lastly, a method and/or system may control imaging operations of a rendering device by receiving a non-rasterized page description language data to be rendered; rasterizing the received image; creating, post rasterization, a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; determining an order of transformation operations to be performed upon the rasterized data; generating, from the source transformation matrix, a rotation transformation matrix and a scaling transformation matrix based upon a rotation scaling order of the determined order of transformation operations; generating a translation transformation matrix from the generated rotation and scaling transformation matrices; creating a target transformation matrix by matrix multiplying the generated rotation transformation matrix, the generated scaling transformation matrix, and the generated transformation operation in a matrix order corresponding to the determined order of transformation operations to be performed upon the rasterized data; decomposing the target transformation matrix into a plurality of individual transformation operation matrices, each transformational operation matrix representing an independent transformation operation; generating a discrete transformation operation value, from a corresponding individual transformational operation matrix, for each transformation operation to be performed upon the rasterized data; and transforming the rasterized data based upon the generated discrete transformation operation values.

It is noted that the source transformation matrix is defined by user defined operations, by system defined operations, or a combination thereof.

A method of rendering rasterized data may receive non-rasterized page description language data and a corresponding transformation matrix representing transformation operations to be performed; rasterize the non-rasterized page description language data to create rasterized data; decompose the corresponding transformation matrix into a rotation transformation operation matrix, a first scaling transformation operation matrix, and a translation transformation operation matrix; decompose the first scaling transformation operation matrix into a shear transformation operation matrix and a second scaling transformation operation matrix; generate a discrete rotation transformation operation value from the rotation transformation operation matrix; generate a discrete scaling transformation operation value from the second scaling transformation operation matrix; generate a discrete translation transformation operation value from the translation transformation operation matrix; generate a discrete shear transformation operation value from the shear transformation operation matrix; and perform transformation operations upon the rasterized data based upon the generated discrete transformation operation values.

The corresponding transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The corresponding transformation matrix may represent a device independent transformation operation.

A method of controlling imaging operations of a rendering device may receive a non-rasterized page description language data to be rendered; create a transformation matrix representing transformation operations; rasterize the received image; decompose the transformation matrix into a rotation transformation operation matrix, a first scaling transformation operation matrix, and a translation transformation operation matrix; decompose the first scaling transformation operation matrix into a shear transformation operation matrix and a second scaling transformation operation matrix; generate a discrete rotation transformation operation value from the rotation transformation operation matrix; generate a discrete scaling transformation operation value from the second scaling transformation operation matrix; generate a discrete translation transformation operation value from the translation transformation operation matrix; generate a discrete shear transformation operation value from the shear transformation operation matrix; and perform transformation operations upon the rasterized data based upon the generated discrete transformation operation values.

The transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The transformation matrix may represent a device independent transformation operation.

The transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The transformation matrix may represent a device independent transformation operation.

A method of controlling imaging operations of a rendering device may receive a non-rasterized page description language data to be rendered; rasterize the received image; create, post rasterization, a transformation matrix representing transformation operations; decompose the transformation matrix into a rotation transformation operation matrix, a first scaling transformation operation matrix, and a translation transformation operation matrix; decompose the first scaling transformation operation matrix into a shear transformation operation matrix and a second scaling transformation operation matrix; generate a discrete rotation transformation operation value from the rotation transformation operation matrix; generate a discrete scaling transformation operation value from the second scaling transformation operation matrix; generate a discrete translation transformation operation value from the translation transformation operation matrix; generate a discrete shear transformation operation value from the shear transformation operation matrix; and transform the rasterized data based upon the generated discrete transformation operation values.

The transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The transformation matrix may represent a device independent transformation operation.

A system for rendering a rasterized data may include a rasterizing circuit to rasterize a non-rasterized page description language data, the non-rasterized page description language data having a corresponding transformation matrix representing transformation operations to be performed; a transformation matrix decomposing circuit to decompose the corresponding transformation matrix representing transformation operations to be performed and to generate a discrete transformation operation value, from a corresponding individual transformation operation matrix, for each transformation operation to be performed upon the rasterized data; and a plurality of post-rasterization transformation circuits, operatively connected to the rasterizing circuit and the transformation matrix decomposing circuit, to perform transformation operations upon the rasterized data. The plurality of post-rasterization transformation circuits are a predetermined order for performing the transformation operations upon the rasterized data in the predetermined order.

The transformation matrix decomposing circuit decomposes the corresponding transformation matrix into a rotation transformation operation matrix, a first scaling transformation operation matrix, and a translation transformation operation matrix.

The transformation matrix decomposing circuit decomposes the first scaling transformation operation matrix into a shear transformation operation matrix and a second scaling transformation operation matrix.

The transformation matrix decomposing circuit decomposes the corresponding transformation matrix in an order corresponding to the predetermined order for performing the transformation operations upon the rasterized data.

The transformation matrix decomposing circuit decomposes the first scaling transformation matrix in an order corresponding to an order of the scaling transformation operation and shear transformation operation being performed upon the rasterized data.

The transformation matrix decomposing circuit generates a discrete rotation transformation operation value from the rotation transformation operation matrix. The transformation matrix decomposing circuit generates a discrete scaling transformation operation value from the second scaling transformation operation matrix. The transformation matrix decomposing circuit generates a discrete translation transformation operation value from the translation transformation operation matrix. The transformation matrix decomposing circuit generates a discrete shear transformation operation value from the shear transformation operation matrix.

The plurality of post-rasterization transformation circuits utilizes the generated discrete transformation operation values to control the transformation operations upon the rasterized data.

The corresponding transformation matrix may represent a device independent transformation operation. The corresponding transformation matrix may be defined by user defined operations. The system corresponding transformation matrix may be defined by system defined operations.

A system for rendering a rasterized data may include a rasterizing circuit to rasterize a non-rasterized page description language data; a transformation matrix circuit for generating a transformation matrix representing transformation operations; a transformation matrix decomposing circuit to decompose the generated transformation matrix representing transformation operations and to generate a discrete transformation operation value, from a corresponding individual transformation operation matrix, for each transformation operation to be performed upon the rasterized data; and a plurality of post-rasterization transformation circuits, operatively connected to said rasterizing circuit and said transformation matrix decomposing circuit, to perform transformation operations upon the rasterized data.

The plurality of post-rasterization transformation circuits are a predetermined order for performing the transformation operations upon the rasterized data in the predetermined order.

The transformation matrix decomposing circuit decomposes the transformation matrix into a rotation transformation operation matrix, a first scaling transformation operation matrix, and a translation transformation operation matrix. The transformation matrix decomposing circuit decomposes the first scaling transformation operation matrix into a shear transformation operation matrix and a second scaling transformation operation matrix. The transformation matrix decomposing circuit decomposes the corresponding transformation matrix in an order corresponding to the predetermined order for performing the transformation operations upon the rasterized data. The transformation matrix decomposing circuit decomposes the first scaling transformation matrix in an order corresponding to an order of the scaling transformation operation and shear transformation operation being performed upon the rasterized data.

The transformation matrix decomposing circuit generates a discrete rotation transformation operation value from the rotation transformation operation matrix. The transformation matrix decomposing circuit generates a discrete scaling transformation operation value from the second scaling transformation operation matrix. The transformation matrix decomposing circuit generates a discrete translation transformation operation value from the translation transformation operation matrix. The transformation matrix decomposing circuit generates a discrete shear transformation operation value from the shear transformation operation matrix.

The plurality of post-rasterization transformation circuits utilizes the generated discrete transformation operation values to control the transformation operations upon the rasterized data.

The system transformation matrix may be defined by user defined operations. The system transformation matrix may be defined by system defined operations. The system transformation matrix circuit may generate a transformation matrix representing transformation operations before rasterization of the non-rasterized page description language data.

A method of rendering a rasterized data receives a non-rasterized page description language data and a source transformation matrix representing source transformation operations, the source transformation operations being a source rotation transformation operation, a source scaling transformation operation, and a source translation transformation operation; rasterizes the non-rasterized page description language data; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and performs transformation operations upon the rasterized data based upon the generated discrete transformation operation values.

The corresponding transformation matrix may be decomposed in an order corresponding to an order of the transformation operations being performed upon the rasterized data. The e first scaling transformation matrix may be decomposed in an order corresponding to an order of the scaling transformation operation and shear transformation operation being performed upon the rasterized data. The corresponding transformation matrix may represent a device independent transformation operation.

A method of controlling imaging operations of a rendering device receives a non-rasterized page description language data to be rendered; creates a source transformation matrix representing source transformation operations, the source transformation operations being a source rotation transformation operation, a source scaling transformation operation, and a source translation transformation operation; rasterizes the received image; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix;

generates a discrete scaling transformation operation value from the second scaling transformation operation matrix; generates a discrete translation transformation operation value from the translation transformation operation matrix; generates a discrete shear transformation operation value from the shear transformation operation matrix; and transform the rasterized data based upon the generated discrete transformation operation values.

The method transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The transformation matrix may represent a device independent transformation operation.

A method of controlling imaging operations of a rendering device receives a non-rasterized page description language data to be rendered; rasterizes the received image; creates, post rasterization, a source transformation matrix representing transformation operations; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and transform the rasterized data based upon the generated discrete transformation operation values.

The transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The method transformation matrix may represent a device independent transformation operation.

A system for rendering a rasterized data includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; and a processor to generate, from the source transformation matrix, a rotation dependent scaling transformation matrix and a rotation dependent translation transformation matrix.

The processor determines an order of transformation operations to be performed upon the rasterized data and creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and the processor decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The corresponding transformation matrix may represent a device independent transformation operation. The corresponding transformation matrix may be defined by user defined operations. The corresponding transformation matrix may be defined by system defined operations.

A system for rendering a rasterized data includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; and a processor to generate, from the source transformation matrix, a rotation dependent scaling transformation matrix and a rotation dependent translation transformation matrix.

The processor determines an order of transformation operations to be performed upon the rasterized data and creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The transformation matrix may represent a device independent transformation operation. The transformation matrix circuit may generate a transformation matrix representing transformation operations before rasterization of the non-rasterized page description language data. The transformation matrix circuit may generate a transformation matrix representing transformation operations after rasterization of the non-rasterized page description language data.

A method of rendering rasterized data receives a non-rasterized page description language data and a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizes the non-rasterized page description language data; generates, from the source transformation matrix, a rotation transformation matrix, a scaling transformation matrix and a translation transformation matrix based on a predetermined matrix order; determines a rotation value from the rotation transformation matrix; determines an order of transformation operations to be performed upon the rasterized data; creates an order dependent rotation dependent scaling transformation matrix and an order dependent rotation dependent translation transformation matrix; creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and performs transformation operations upon the rasterized data based upon the generated discrete transformation operation values.

The corresponding transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The corresponding transformation matrix may represent a device independent transformation operation.

A method of controlling imaging operations of a rendering device receives a non-rasterized page description language data to be rendered; creates a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizes the received image; generates, from the source transformation matrix, a rotation transformation matrix, a scaling transformation matrix and a translation transformation matrix based on a predetermined matrix order; determines a rotation value from the rotation transformation matrix; determines an order of transformation operations to be performed upon the rasterized data; creates an order dependent rotation dependent scaling transformation matrix and an order dependent rotation dependent translation transformation matrix; creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposes the target transformation matrix representing the transformation operations into a plurality of ordered transformational operation matrices, each transformational operation matrix representing an independent transformation operation; generates a discrete transformation operation value, from a corresponding individual transformational operation matrix, for each transformation operation to be performed upon the rasterized data; and transform the rasterized data based upon the generated discrete transformation operation values.

The transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The transformation matrix may represent a device independent transformation operation.

A system for rendering rasterized data includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; and a processor to generate, from the source transformation matrix, a rotation transformation matrix, a scaling transformation matrix and a translation transformation matrix based on a predetermined matrix order.

The processor determines a rotation value from the rotation transformation matrix and determines an order of transformation operations to be performed upon the rasterized data. The processor creates an order dependent rotation dependent scaling transformation matrix and an order dependent rotation dependent translation transformation matrix and creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The corresponding transformation matrix may represent a device independent transformation operation. The corresponding transformation matrix may be defined by user defined operations. The corresponding transformation matrix may be defined by system defined operations.

A system for rendering a rasterized data includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; and a processor to generate, from the source transformation matrix, a rotation transformation matrix, a scaling transformation matrix and a translation transformation matrix based on a predetermined matrix order.

The processor determines a rotation value from the rotation transformation matrix and determines an order of transformation operations to be performed upon the rasterized data. The processor creates an order dependent rotation dependent scaling transformation matrix and an order dependent rotation dependent translation transformation matrix and creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The transformation matrix may represent a device independent transformation operation. The transformation matrix may be defined by user defined operations. The transformation matrix may be defined by system defined operations. The transformation matrix circuit may generate a transformation matrix representing transformation operations before rasterization of the non-rasterized page description language data. The transformation matrix circuit may generate a transformation matrix representing transformation operations after rasterization of the non-rasterized page description language data. The transformation matrix circuit may generate a transformation matrix representing transformation operations before and after rasterization of the non-rasterized page description language data. The non-rasterized page description language data may be vector-graphic based data.

A method of rendering rasterized data receives a non-rasterized page description language data and a source transformation matrix representing source transformation operations, the source transformation operations being a source rotation transformation operation, a source scaling transformation operation, and a source translation transformation operation; rasterizes the non-rasterized page description language data; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and performs transformation operations upon the rasterized data based upon the generated discrete transformation operation values.

The corresponding transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The source transformation matrix may be a transformation matrix created by an ordered matrix multiplication of a plurality of individual transformation operation matrices, each individual transformation operation matrix representing a rotation transformation operation, a scaling transformation operation, or a source translation transformation operation.

A method of controlling imaging operations of a rendering device receives a non-rasterized page description language data to be rendered; creates a source transformation matrix representing source transformation operations, the source transformation operations being a source rotation transformation operation, a source scaling transformation operation, and a source translation transformation operation; rasterizes the received image; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and transform the rasterized data based upon the generated discrete transformation operation values.

The corresponding transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The source transformation matrix may be a transformation matrix created by an ordered matrix multiplication of a plurality of individual transformation operation matrices, each individual transformation operation matrix representing a rotation transformation operation, a scaling transformation operation, or a source translation transformation operation.

A method of controlling imaging operations of a rendering device receives a non-rasterized page description language data to be rendered; rasterizes the received image; creates, post rasterization, a source transformation matrix representing transformation operations; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and transform the rasterized data based upon the generated discrete transformation operation values.

The corresponding transformation matrix may be decomposed in an order corresponding to an order of the transformation operations being performed upon the rasterized data. The first scaling transformation matrix may be decomposed in an order corresponding to an order of the scaling transformation operation and shear transformation operation being performed upon the rasterized data. The source transformation matrix may be a transformation matrix created by an ordered matrix multiplication of a plurality of individual transformation operation matrices, each individual transformation operation matrix representing a rotation transformation operation, a scaling transformation operation, or a source translation transformation operation.

A system for rendering rasterized data includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; and a processor to determine an order of transformation operations to be performed upon the rasterized data.

The processor generates, from the source transformation matrix, a rotation transformation matrix and a scaling transformation matrix based upon a rotation scaling order of the determined order of transformation operations and generates a translation transformation matrix from the generated rotation and scaling transformation matrices.

The processor creates a target transformation matrix by matrix multiplying the generated rotation transformation matrix, the generated scaling transformation matrix, and the generated transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The corresponding transformation matrix may represent a device independent transformation operation. The corresponding transformation matrix may represent device independent rotation, scaling, shear, and translation operations. The source transformation matrix may be a transformation matrix created by an ordered matrix multiplication of a plurality of individual transformation operation matrices, each individual transformation operation matrix representing a rotation transformation operation, a scaling transformation operation, or a source translation transformation operation.

A system for rendering rasterized data includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; and a processor to determine an order of transformation operations to be performed upon the rasterized data.

The processor generates, from the source transformation matrix, a rotation transformation matrix and a scaling transformation matrix based upon a rotation scaling order of the determined order of transformation operations and generates a translation transformation matrix from the generated rotation and scaling transformation matrices.

The processor creates a target transformation matrix by matrix multiplying the generated rotation transformation matrix, the generated scaling transformation matrix, and the generated transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The system further includes a plurality of post-rasterization transformation circuits, operatively connected to the rasterizing circuit and the transformation matrix decomposing circuit, to perform transformation operations upon the rasterized data.

The corresponding transformation matrix may represent a device independent transformation operation. The corresponding transformation matrix may represent device independent rotation, scaling, shear, and translation operations. The source transformation matrix may be a transformation matrix created by an ordered matrix multiplication of a plurality of individual transformation operation matrices, each individual transformation operation matrix representing a rotation transformation operation, a scaling transformation operation, or a source translation transformation operation.

A method of controlling operations of a printing device receives non-rasterized page description language data and a corresponding transformation matrix representing transformation operations to be performed; rasterizes the non-rasterized page description language data to create rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; creates a transformation matrix representing transformation operations; rasterizes the received image; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; rasterizes the received image; creates, post rasterization, a transformation matrix representing transformation operations; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A system for controlling operations of a printing device includes a rasterizing circuit to rasterize a non-rasterized page description language data, the non-rasterized page description language data having a corresponding transformation matrix representing transformation operations to be performed; a transformation matrix decomposing circuit to decompose the corresponding transformation matrix representing transformation operations to be performed and to generate a discrete transformation operation value, from a corresponding individual transformation operation matrix, for each transformation operation to be performed upon the rasterized data; a printing device to render the rasterized data; and a controller to control operations of the printing device.

The transformation matrix decomposing circuit decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The transformation matrix decomposing circuit generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A system for controlling operations of a printing device includes a rasterizing circuit to rasterize a non-rasterized page description language data; a transformation matrix circuit for generating a transformation matrix representing transformation operations; a transformation matrix decomposing circuit to decompose the generated transformation matrix representing transformation operations and to generate a discrete transformation operation value, from a corresponding individual transformation operation matrix, for each transformation operation to be performed upon the rasterized data; a printing device to render the rasterized data; and a controller to control operations of the printing device.

The transformation matrix decomposing circuit decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The transformation matrix decomposing circuit generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A method of controlling operations of a printing device receives a non-rasterized page description language data and a source transformation matrix representing source transformation operations, the source transformation operations being a source rotation transformation operation, a source scaling transformation operation, and a source translation transformation operation; rasterizes the non-rasterized page description language data; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; creates a source transformation matrix representing source transformation operations, the source transformation operations being a source rotation transformation operation, a source scaling transformation operation, and a source translation transformation operation; rasterizes the received image; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; rasterizes the received image; creates, post rasterization, a source transformation matrix representing transformation operations; generates, from the source transformation matrix, a rotation dependent scaling transformation matrix and a rotation dependent translation transformation matrix; determines an order of transformation operations to be performed upon the rasterized data; creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A system for controlling operations of a printing device includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; a processor to generate, from the source transformation matrix, a rotation dependent scaling transformation matrix and a rotation dependent translation transformation matrix; a printing device to render the rasterized data; and a controller to control operations of the printing device.

The processor determines an order of transformation operations to be performed upon the rasterized data and creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data.

The processor decomposes the source transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A system for controlling operations of a printing device includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; a printing device to render the rasterized data; a controller to control operations of the printing device; and a processor for determining an order of transformation operations to be performed upon the rasterized data.

The processor creates a target transformation matrix by matrix multiplying the rotation dependent scaling transformation matrix, the rotation dependent translation transformation matrix, and the source rotation transformation operation in a matrix order corresponding to the determined order of transformation operations to be performed upon the rasterized data.

The processor decomposes the source transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A method of controlling operations of a printing device receives a non-rasterized page description language data and a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizes the non-rasterized page description language data; generates, from the source transformation matrix, a rotation transformation matrix, a scaling transformation matrix and a translation transformation matrix based on a predetermined matrix order; determines a rotation value from the rotation transformation matrix; determines an order of transformation operations to be performed upon the rasterized data; creates an order dependent rotation dependent scaling transformation matrix and an order dependent rotation dependent translation transformation matrix; creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; creates a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; rasterizes the received image; generates, from the source transformation matrix, a rotation transformation matrix, a scaling transformation matrix and a translation transformation matrix based on a predetermined matrix order; determines a rotation value from the rotation transformation matrix; determines an order of transformation operations to be performed upon the rasterized data; creates an order dependent rotation dependent scaling transformation matrix and an order dependent rotation dependent translation transformation matrix; creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposes the target transformation matrix representing the transformation operations into a plurality of ordered transformational operation matrices, each transformational operation matrix representing an independent transformation operation; generates a discrete transformation operation value, from a corresponding individual transformational operation matrix, for each transformation operation to be performed upon the rasterized data; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling imaging operations of a rendering device receives a non-rasterized page description language data to be rendered; rasterizes the received image; creates, post rasterization, a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation; generates, from the source transformation matrix, a rotation transformation matrix, a scaling transformation matrix and a translation transformation matrix based on a predetermined matrix order; determines a rotation value from the rotation transformation matrix; determines an order of transformation operations to be performed upon the rasterized data; creates an order dependent rotation dependent scaling transformation matrix and an order dependent rotation dependent translation transformation matrix; creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and; and transforms the rasterized data based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A system for controlling operations of a printing device includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; a processor to generate, from the source transformation matrix, a rotation transformation matrix, a scaling transformation matrix and a translation transformation matrix based on a predetermined matrix order; a printing device to render the rasterized data; and a controller to control operations of the printing device.

The processor determines a rotation value from the rotation transformation matrix and determines an order of transformation operations to be performed upon the rasterized data.

The processor creates an order dependent rotation dependent scaling transformation matrix and an order dependent rotation dependent translation transformation matrix and creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data.

The processor decomposes the source transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A system for controlling operations of a printing device includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; a printing device to render the rasterized data; a controller to control operations of the printing device; and a processor for determining an order of transformation operations to be performed upon the rasterized data.

The processor generates, from the source transformation matrix, a rotation transformation matrix, a scaling transformation matrix and a translation transformation matrix based on a predetermined matrix order.

The processor determines a rotation value from the rotation transformation matrix and determines an order of transformation operations to be performed upon the rasterized data.

The processor creates an order dependent rotation dependent scaling transformation matrix and an order dependent rotation dependent translation transformation matrix and creates a target transformation matrix by matrix multiplying the rotation dependent scaling transformation matrix, the rotation dependent translation transformation matrix, and the rotation transformation operation in a matrix order corresponding to the determined order of transformation operations to be performed upon the rasterized data.

The processor decomposes the source transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; decomposes the corresponding transformation matrix in an order corresponding to the predetermined order for performing the transformation operations upon the rasterized data; and decomposes the first scaling transformation matrix in an order corresponding to an order of the scaling transformation operation and shear transformation operation being performed upon the rasterized data.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A method of controlling operations of a printing device receives a non-rasterized page description language data and a source transformation matrix representing source transformation operations, the source transformation operations being a source rotation transformation operation, a source scaling transformation operation, and a source translation transformation operation; rasterizes the non-rasterized page description language data; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the corresponding transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; creates a source transformation matrix representing source transformation operations, the source transformation operations being a source rotation transformation operation, a source scaling transformation operation, and a source translation transformation operation; rasterizes the received image; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A method of controlling operations of a printing device receives a non-rasterized page description language data to be rendered; rasterizes the received image; creates, post rasterization, a source transformation matrix representing transformation operations; determines an order of transformation operations to be performed upon the rasterized data; generates, from the source transformation matrix, a rotation transformation matrix and a scaling transformation matrix based upon a rotation scaling order of the determined order of transformation operations; generates a translation transformation matrix from the generated rotation and scaling transformation matrices; creates a target transformation matrix by matrix multiplying the generated rotation transformation matrix, the generated scaling transformation matrix, and the generated transformation operation in a matrix order corresponding to the determined order of transformation operations to be performed upon the rasterized data; decomposes the transformation matrix into a rotation transformation operation matrix, a first scaling transformation operation matrix, and a translation transformation operation matrix; decomposes the first scaling transformation operation matrix into a shear transformation operation matrix and a second scaling transformation operation matrix; generates a discrete rotation transformation operation value from the rotation transformation operation matrix; generates a discrete scaling transformation operation value from the second scaling transformation operation matrix; generates a discrete translation transformation operation value from the translation transformation operation matrix; generates a discrete shear transformation operation value from the shear transformation operation matrix; and controls operations of the printing device based upon the generated discrete transformation operation values.

The controlling operations of the printing device based upon the generated discrete transformation operation values may control an orientation of a recording medium based upon the generated discrete shear transformation operation value. The controlling operations of the printing device based upon the generated discrete transformation operation values may control a speed of a photosensitive medium, for recording a latent image, based upon the generated discrete shear transformation operation value. The controlling operations of the printing device based upon the generated discrete transformation operation values may control a magnification of an illumination device, for recording a latent image, based upon the generated discrete shear transformation operation value.

A system for controlling operations of a printing device includes a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation; a processor to determine an order of transformation operations to be performed upon the rasterized data; a printing device to render the rasterized data; and a controller to control operations of the printing device.

The processor generates, from the source transformation matrix, a rotation transformation matrix and a scaling transformation matrix based upon a rotation scaling order of the determined order of transformation operations and generates a translation transformation matrix from the generated rotation and scaling transformation matrices.

The processor creates a target transformation matrix by matrix multiplying the generated rotation transformation matrix, the generated scaling transformation matrix, and the generated transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix and decomposes the first scaling transformation operation matrix into a shear transformation operation matrix and a second scaling transformation operation matrix.

The processor generates a discrete rotation transformation operation value from the rotation transformation operation matrix; a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

A system for controlling operations of a printing device includes a rasterizing circuit to rasterize a non-rasterized page description language data; a transformation matrix circuit for generating a source transformation matrix representing source transformation operations, the source transformation operations being a source rotation transformation operation, a source scaling transformation operation, and a source translation transformation operation; a printing device to render the rasterized data; a controller to control operations of the printing device; and a processor to determine an order of transformation operations to be performed upon the rasterized data.

The processor generates, from the source transformation matrix, a rotation transformation matrix and a scaling transformation matrix based upon a rotation scaling order of the determined order of transformation operations and generates a translation transformation matrix from the generated rotation and scaling transformation matrices.

The processor creates a target transformation matrix by matrix multiplying the generated rotation transformation matrix, the generated scaling transformation matrix, and the generated transformation operation in a matrix order corresponding to the determined order of transformation operations to be performed upon the rasterized data.

The processor decomposes the corresponding transformation matrix into a rotation transformation operation matrix, a first scaling transformation operation matrix, and a translation transformation operation matrix; and decomposes the first scaling transformation operation matrix into a shear transformation operation matrix and a second scaling transformation operation matrix.

The processor generates a discrete rotation transformation operation value from the rotation transformation operation matrix; generates a discrete scaling transformation operation value from the second scaling transformation operation matrix; a discrete translation transformation operation value from the translation transformation operation matrix; and a discrete shear transformation operation value from the shear transformation operation matrix.

The controller controls operations of the printing device based upon the generated discrete transformation operation values.

The controller may control operations of the printing device based upon the generated discrete transformation operation values by controlling an orientation of a recording medium based upon the generated discrete shear transformation operation value. The controller may control operations of the printing based upon the generated discrete transformation operation values by controlling a speed of a photosensitive medium, for recording a latent image, based upon the generated discrete shear transformation operation value. The controller may control operations of the printing based upon the generated discrete transformation operation values by controlling a magnification of an illumination device, for recording a latent image, based upon the generated discrete shear transformation operation value.

It should be noted that although the above processes have been described within the context of software and/or methods, the above processes are also applicable to circuits, application specific circuits, and/or firmware.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of rendering rasterized data, comprising:
receiving a non-rasterized page description language data and a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a source translation transformation operation;
rasterizing, using a processor, the non-rasterized page description language data;
generating, from the source transformation matrix, a rotation transformation matrix, a scaling transformation matrix and a translation transformation matrix based on a predetermined matrix order;
determining a rotation value from the rotation transformation matrix,
determining an order of transformation operations to be performed upon the rasterized data;
creating an order dependent rotation dependent scaling transformation matrix and an order dependent rotation dependent translation transformation matrix;
creating a target transformation matrix by matrix multiplying the rotation dependent scaling transformation matrix, the rotation dependent translation transformation matrix, and the rotation transformation matrix in a matrix order corresponding to the determined order of transformation operations to be performed upon the rasterized data;
decomposing the target transformation matrix into a rotation transformation operation matrix, a first scaling transformation operation matrix, and a translation transformation operation matrix;
decomposing the first scaling transformation operation matrix into a shear transformation operation matrix and a second scaling transformation operation matrix;
generating a discrete rotation transformation operation value from the rotation transformation operation matrix;
generating a discrete scaling transformation operation value from the second scaling transformation operation matrix;
generating a discrete translation transformation operation value from the translation transformation operation matrix;
generating a discrete shear transformation operation value from the shear transformation operation matrix; and
performing transformation operations upon the rasterized data based upon the generated discrete transformation operation values.

2. The method as claimed in claim 1, wherein the target transformation matrix is decomposed in an order corresponding to an order of the transformation operations being performed upon the rasterized data.

3. The method as claimed in claim 1, wherein the first scaling transformation matrix is decomposed in an order corresponding to an order of the scaling transformation operation and shear transformation operation being performed upon the rasterized data.

4. The method as claimed in claim 1, wherein the target transformation matrix represents a device independent transformation operation.

5. A method of controlling imaging operations of a rendering device, comprising:
receiving a non-rasterized page description language data to be rendered;
creating a source transformation matrix, the source transformation matrix being a transformation matrix created by an ordered matrix multiplication of a plurality of individual transformation operation matrices, each individual transformation operation matrix representing a rotation transformation operation, a scaling transformation operation, or a translation transformation operation;
rasterizing, using a processor, the received image;
generating, from the source transformation matrix, a rotation transformation matrix, a scaling transformation matrix and a translation transformation matrix based on a predetermined matrix order;
determining a rotation value from the rotation transformation matrix,
determining an order of transformation operations to be performed upon the rasterized data;
creating an order dependent rotation dependent scaling transformation matrix and an order dependent rotation dependent translation transformation matrix;
creating a target transformation matrix by matrix multiplying the rotation dependent scaling transformation matrix, the rotation dependent translation transformation matrix, and the rotation transformation matrix in a matrix order corresponding to the determined order of transformation operations to be performed upon the rasterized data;
decomposing the target transformation matrix representing the transformation operations into a plurality of ordered transformational operation matrices, each transformational operation matrix representing an independent transformation operation;
generating a discrete transformation operation value, from a corresponding individual transformational operation matrix, for each transformation operation to be performed upon the rasterized data; and
transforming the rasterized data based upon the generated discrete transformation operation values.

6. The method as claimed in claim 5, wherein the target transformation matrix is decomposed in an order corresponding to an order of the transformation operations being performed upon the rasterized data.

7. The method as claimed in claim 5, wherein the first scaling transformation matrix is decomposed in an order corresponding to an order of the scaling transformation operation and shear transformation operation being performed upon the rasterized data.

8. The method as claimed in claim 5, wherein the target transformation matrix represents a device independent transformation operation.

9. A system for rendering rasterized data, comprising:
a rasterizing circuit to rasterize a non-rasterized page description language data, the non-rasterized page description language data having a source transformation matrix representing source transformation operations, the source transformation operations being a source rotation transformation operation, a source scaling transformation operation, and a source translation transformation operation;
a processor to generate, from the source transformation matrix, a rotation transformation matrix, a scaling transformation matrix and a translation transformation matrix based on a predetermined matrix order; and
said processor determining a rotation value from the rotation transformation matrix;
said processor determining an order of transformation operations to be performed upon the rasterized data;
said processor creating an order dependent rotation dependent scaling transformation matrix and an order dependent rotation dependent translation transformation matrix;
said processor creating a target transformation matrix by matrix multiplying the rotation dependent scaling transformation matrix, the rotation dependent translation transformation matrix, and the rotation transformation matrix in a matrix order corresponding to the determined order of transformation operations to be performed upon the rasterized data;
said processor decomposing the target transformation matrix into a rotation transformation operation matrix, a first scaling transformation operation matrix, and a translation transformation operation matrix;
said processor decomposing the first scaling transformation operation matrix into a shear transformation operation matrix and a second scaling transformation operation matrix;
said processor generating a discrete rotation transformation operation value from the rotation transformation operation matrix;
said processor generating a discrete scaling transformation operation value from the second scaling transformation operation matrix;
said processor generating a discrete translation transformation operation value from the translation transformation operation matrix;
said processor generating a discrete shear transformation operation value from the shear transformation operation matrix;
a plurality of post-rasterization transformation circuits, operatively connected to said rasterizing circuit and said processor, to perform transformation operations upon the rasterized data.

10. The system as claimed in claim 9, wherein the target transformation matrix represents a device independent transformation operation.

11. The system as claimed in claim 9, wherein the target transformation matrix is defined by user defined operations.

12. The system as claimed in claim 9, wherein the target transformation matrix is defined by system defined operations.

13. A system for rendering a rasterized data, comprising:
a rasterizing circuit to rasterize a non-rasterized page description language data;
a transformation matrix circuit for generating a source transformation matrix representing source transformation operations, the source transformation operations being a source rotation transformation operation, a source scaling transformation operation, and a source translation transformation operation;
a processor to generate, from the source transformation matrix, a rotation transformation matrix, a scaling transformation matrix and a translation transformation matrix based on a predetermined matrix order; and
said processor determining a rotation value from the rotation transformation matrix;
said processor determining an order of transformation operations to be performed upon the rasterized data;
said processor creating an order dependent rotation dependent scaling transformation matrix and an order dependent rotation dependent translation transformation matrix;
said processor creating a target transformation matrix by matrix multiplying the rotation dependent scaling transformation matrix, the rotation dependent translation transformation matrix, and the rotation transformation matrix in a matrix order corresponding to the determined order of transformation operations to be performed upon the rasterized data;
said processor decomposing the target transformation matrix into a rotation transformation operation matrix, a first scaling transformation operation matrix, and a translation transformation operation matrix;
said processor decomposing the first scaling transformation operation matrix into a shear transformation operation matrix and a second scaling transformation operation matrix;
said processor generating a discrete rotation transformation operation value from the rotation transformation operation matrix;
said processor generating a discrete scaling transformation operation value from the second scaling transformation operation matrix;
said processor generating a discrete translation transformation operation value from the translation transformation operation matrix;
said processor generating a discrete shear transformation operation value from the shear transformation operation matrix;
a plurality of post-rasterization transformation circuits, operatively connected to said rasterizing circuit and said processor, to perform transformation operations upon the rasterized data.

14. The system as claimed in claim 13, wherein the target transformation matrix represents a device independent transformation operation.

15. The system as claimed in claim 13, wherein the target transformation matrix is defined by user defined operations.

16. The system as claimed in claim 13, wherein the target transformation matrix is defined by system defined operations.

17. The system as claimed in claim 13, wherein said transformation matrix circuit generates a source transformation matrix representing transformation operations before rasterization of the non-rasterized page description language data.

18. The system as claimed in claim 13, wherein said transformation matrix circuit generates a source transformation matrix representing transformation operations after rasterization of the non-rasterized page description language data.

19. The system as claimed in claim 13, wherein said transformation matrix circuit generate a source transformation matrix representing transformation operations before and after rasterization of the non-rasterized page description language data.

20. The system as claimed in claim 13, wherein the non-rasterized page description language data is vector-graphic based data.

* * * * *